United States Patent
Aberham et al.

(10) Patent No.: US 12,013,773 B2
(45) Date of Patent: Jun. 18, 2024

(54) GENERATING DEBUGGABLE EXECUTABLES BASED ON OPTIMIZING DIFFERENT COMPILER OPTIONS FOR SOURCE CODE MODULES

(71) Applicant: International Business Machines Corporation, Armonk, NY (US)

(72) Inventors: Jana Christine Aberham, Aidlingen (DE); Christopher Noelting, Leinfelden-Echterdingen (DE); Carsten Otte, Stuttgart (DE); Oleg Tsemaylo, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 17/547,630

(22) Filed: Dec. 10, 2021

(65) Prior Publication Data
US 2023/0185693 A1    Jun. 15, 2023

(51) Int. Cl.
*G06F 9/44*    (2018.01)
*G06F 8/41*    (2018.01)
(Continued)

(52) U.S. Cl.
CPC .......... *G06F 11/3624* (2013.01); *G06F 8/443* (2013.01); *G06F 8/71* (2013.01); *G06F 11/3628* (2013.01); *G06F 11/3664* (2013.01)

(58) Field of Classification Search
CPC ............. G06F 11/3624; G06F 11/3628; G06F 11/3664; G06F 8/443; G06F 8/71
See application file for complete search history.

(56) References Cited

U.S. PATENT DOCUMENTS 8,108,849 B2    1/2012    Adolphson
9,448,778 B2    9/2016    Doyle
(Continued)

FOREIGN PATENT DOCUMENTS

CN    112352219 A  *  2/2021    .......... G06F 11/3065
WO    WO-2019241921 A1  *  12/2019    .......... G06F 11/3065

OTHER PUBLICATIONS

Kyriakos Georgiou, Lost in translation: Exposing hidden compiler optimization opportunities, 2020, pp. 1-31. https://arxiv.org/pdf/1903.11397.pdf (Year: 2020).*

(Continued)

*Primary Examiner* — Mongbao Nguyen
(74) *Attorney, Agent, or Firm* — Edward J. Wixted, III

(57) ABSTRACT

An approach for generating a compiled version of a program source code. At least two different executable files may be generated applying at least two different compiler optimization settings for compiling a first part and applying at least two different compiler optimization settings for compiling a second part of the source code. A main performance part of the source code may be determined dependent on values of a target quantity of the at least two different executable files. The main performance part is the part of the first part and the second part that has a greater influence on the target quantity. The compiled version of the program source code may be generated by compiling the source code applying a higher optimization level of the compiler for compiling the main performance part than for compiling the remaining part of the source code.

24 Claims, 10 Drawing Sheets

(51) Int. Cl.
*G06F 8/71* (2018.01)
*G06F 9/445* (2018.01)
*G06F 9/455* (2018.01)
*G06F 11/36* (2006.01)

(56) References Cited

U.S. PATENT DOCUMENTS

| | | | | |
|---|---|---|---|---|
| 2010/0325619 | A1* | 12/2010 | Song | G06F 11/3624 |
| | | | | 717/143 |
| 2014/0344794 | A1 | 11/2014 | Doyle | |
| 2015/0277869 | A1* | 10/2015 | Gschwind | G06F 8/41 |
| | | | | 717/153 |
| 2017/0269915 | A1 | 9/2017 | Pirvu | |
| 2018/0101370 | A1* | 4/2018 | Huang | G06F 8/447 |
| 2018/0107585 | A1* | 4/2018 | Ramesh | G06F 8/443 |
| 2018/0314538 | A1* | 11/2018 | Dierkhising | G06F 9/45558 |
| 2019/0179622 | A1 | 6/2019 | D'Souza | |
| 2019/0303117 | A1* | 10/2019 | Kocberber | G06F 11/3466 |
| 2020/0293299 | A1* | 9/2020 | Santosuosso | G06F 8/41 |
| 2020/0310768 | A1 | 10/2020 | Zhang | |
| 2020/0364036 | A1* | 11/2020 | De Smet | G06F 8/427 |
| 2020/0387363 | A1* | 12/2020 | Waltenberg | G06F 8/53 |
| 2021/0064352 | A1* | 3/2021 | Drepper | G06F 8/4435 |
| 2022/0214866 | A1* | 7/2022 | Li | G06F 8/443 |
| 2023/0176823 | A1* | 6/2023 | Toub | G06F 8/443 |
| | | | | 717/106 |

OTHER PUBLICATIONS

Shouguo Yang, Understand Code Style: Efficient CNN-based Compiler Optimization Recognition System, 2020, pp. 1-6. https://ieeexplore.ieee.org/stamp/stamp.jsp?tp=&arnumber=8761073 (Year: 2020).*

Blackmore et al., "Automatically Tuning the GCC Compiler to Optimize the Performance of Applications Running on Embedded Systems", arXiv:1703.08228v2 [cs.DC], Apr. 11, 2017, 10 pages.

Plotnikov et al., "Automatic Tuning of Compiler Optimizations and Analysis of their Impact", International Conference on Computational Science, ICCS 2013, Procedia Computer Science 18 (2013), doi: 10.1016/j.procs.2013.05.298, pp. 1312-1321.

* cited by examiner

GENERATING DEBUGGABLE EXECUTABLES BASED ON OPTIMIZING DIFFERENT COMPILER OPTIONS FOR SOURCE CODE MODULES

BACKGROUND

The invention relates generally to the field of compilers and specifically, to a generating a compiled version of a program source code based on using different compiler options for different parts of the source code.

It is known to use different compiler options for different parts of the source code to generate an executable file of the source code. By optimizing a use of various compiler settings for different parts of the source code an execution speed of the executable file may be reduced. As well, a size of the executable file may be minimized by varying the compiler settings for the different parts of the source code. However, a fully optimized compiling process may result in an executable file which may be difficult to debug in a real application scenario.

Accordingly, a problem has developed wherein the compiler options for creating the best performing programs, from an executable standpoint, are the programs with the most difficult debugging characteristics. A solution is desired that allows an application to perform at or near optimized performance while providing sufficient debugging characteristics that do not mask software defect, i.e., bugs, reproducibility while debugging.

SUMMARY

Various embodiments provide a computer system and computer program product for generating a compiled version of a program source code by means of a compiler and a method as described by the subject matter of the independent claims. Advantageous embodiments are described in the dependent claims. Embodiments of the present invention can be freely combined with each other if they are not mutually exclusive.

In one aspect, the invention relates to a computer-implemented method for generating a compiled version of a program source code by means of a compiler, the computer-implemented method comprising: splitting the source code into at least a first part and a second part; generating at least two different executable files of the source code, the generating of the at least two different executable files comprising applying at least two different compiler optimization settings for compiling the first part and applying at least two different compiler optimization settings for compiling the second part; determining a respective value of a target quantity for each executable file of the at least two different executable files; determining a main performance part of the source code dependent on the values of the target quantity of the at least two different executable files, wherein the main performance part is the part of the at least first part and the second part that has a greater influence on the target quantity with respect to the different compiler optimization settings; and generating the compiled version of the program source code by compiling the source code, the compiling of the source code comprising applying a higher optimization level of the compiler for compiling the main performance part than for compiling the remaining part of the source code.

In another aspect, the invention relates to a computer program product for generating a compiled version of a program source code by means of a compiler, the computer program product comprising one or more computer-readable storage media, and program instructions collectively stored on the one or more computer-readable storage media, the program instructions comprising: instructions for splitting the source code into at least a first part and a second part; instructions for generating at least two different executable files of the source code, the generating of the at least two different executable files comprising applying at least two different compiler optimization settings for compiling the first part and applying at least two different compiler optimization settings for compiling the second part; instructions for determining a respective value of a target quantity for each executable file of the at least two different executable files; instructions for determining a main performance part of the source code dependent on the values of the target quantity of the at least two different executable files, wherein the main performance part is the part of the at least first part and the second part that has a greater influence on the target quantity with respect to the different compiler optimization settings; and instructions for generating the compiled version of the program source code by compiling the source code, the compiling of the source code comprising applying a higher optimization level of the compiler for compiling the main performance part than for compiling the remaining part of the source code.

In another aspect, the invention relates to a computer system comprising: one or more computer processors; one or more non-transitory computer readable storage media; and program instructions stored on the one or more non-transitory computer readable storage media, the program instructions comprising: program instructions to instructions to split the source code into at least a first part and a second part; program instructions to generate at least two different executable files of the source code based on applying at least two different compiler optimization settings for compiling the first part and applying at least two different compiler optimization settings for compiling the second part; program instructions to determine a respective value of a target quantity for each executable file of the at least two different executable files; program instructions to determine a main performance part of the source code dependent on the values of the target quantity of the at least two different executable files, wherein the main performance part is the part of the at least first part and the second part that has a greater influence on the target quantity with respect to the different compiler optimization settings; and program instructions to generate the compiled version of the program source code by compiling the source code, the compiling of the source code comprising applying a higher optimization level of the compiler for compiling the main performance part than for compiling the remaining part of the source code.

BRIEF DESCRIPTION OF THE SEVERAL VIEWS OF THE DRAWINGS

In the following, embodiments of the invention are explained in greater detail, by way of example only, referring to the drawings in which.

DETAILED DESCRIPTION

Figure 1:
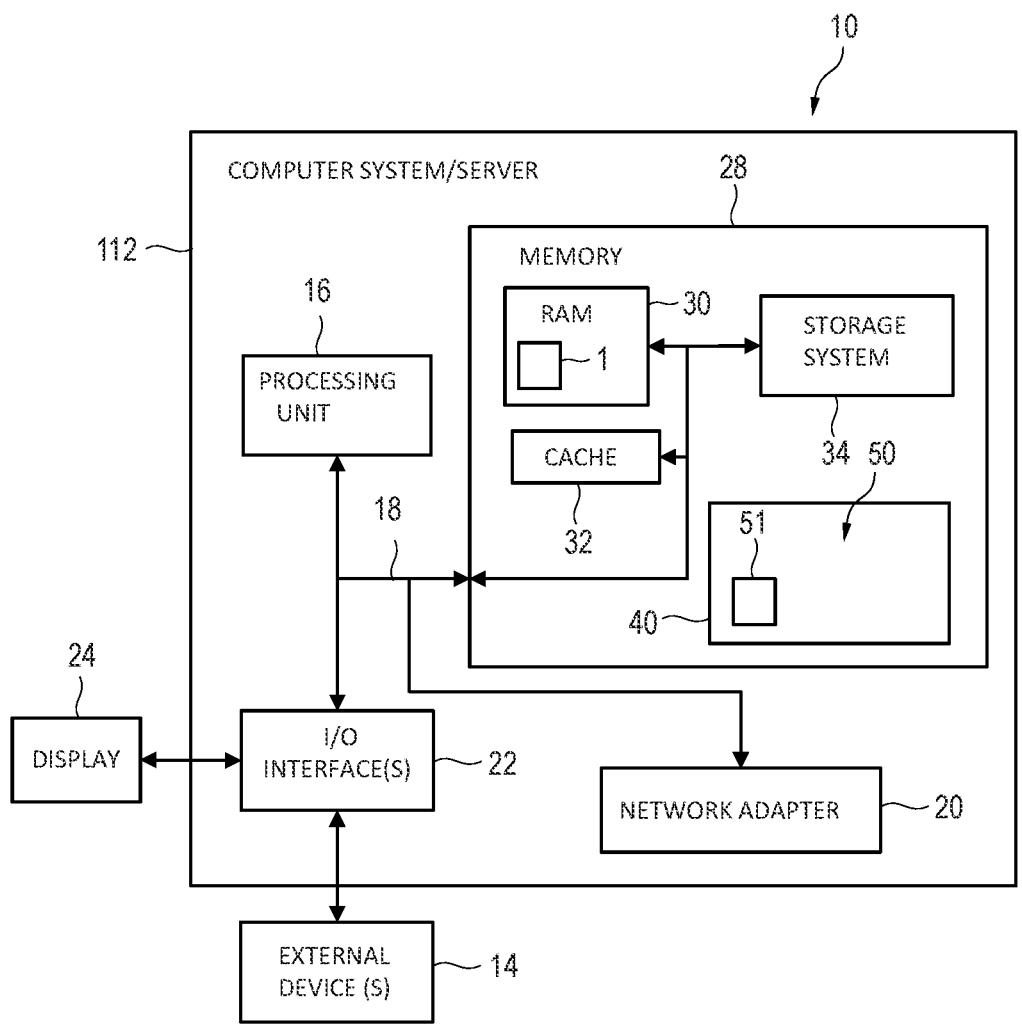
FIG. 1 depicts a block diagram schematically illustrating a computer system according to an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The proposed embodiments can provide that the remaining part of the source code can be easy to debug. This fact is because an optimization level applied for compiling the remaining part of the source code is lower than an optimization level applied for compiling the main performance part of the source code. Generally, the higher the optimization level of the compiler, the higher the difficulty of debugging the source code. If the remaining part of the source code is easy to debug, then the entirety of the source code can be easy to debug compared to a case in which the entire source code is compiled using the optimization level which is applied for the main performance part.

The at least two executable files are files which are executable on a processor of the computer system. This can allow these executable files to run on the processor and determine the respective value of the target quantity of these executable files. On the other hand, the compiled version of the program source code may be designed in the form of a final executable file which is executable on the processor of the computer system or in the form of an object file. In case the compiled version of the program source code is an object file, the compiled version of the program source code may be linked with at least a further object file to form a further final executable file which can be executed on the processor.

According to one embodiment, the respective value of the target quantity of each executable file can be an execution time of the respective executable file. Hence, according to this embodiment, the target quantity is the code execution time. This embodiment can allow generation of the compiled version of the program source code such that an execution time of the final executable file or the further final executable file generated and dependent on the compiled version of the source code, is minimized on the one hand, and the remaining part of the code can be easy to debug on the other hand.

According to one embodiment, the respective value of the target quantity of each executable file may be a size of the respective executable file. Hence, according to this embodiment, the target quantity is the file size. This embodiment can allow the generation of the compiled version of the program source code such that a size of the final executable file or the further final executable file is minimized on the one hand, and the remaining part of the source code can be easy to debug on the other hand.

The term "main performance part" can be defined such that this term describes that one of the parts of the source code, for example the first part or the second part, which may have the highest potential to contribute to generating the compiled version of the source code such that a value of the target quantity of the compiled version of the source code satisfies a performance constraint. In one example, the performance constraint may be satisfied if the value of the target quantity of the compiled version of the source code is below a performance threshold.

The compiler can be a computer program which is designed for translating the program source code, in the following also referred to as source code or code, into a target language. In most cases, the source code may be written in a high-level programming language, such as, but not limited to, Python, Java, C++, C #, Fortran or Pascal. The target language can be a programming language comprising a lower level than the source code. For example, the target language can be an assembly language or machine code. The term "compiling" as used herein can comprise converting one or more parts of the source code into the target language. A compiling of the one or more parts of the source code can comprise converting the one or more parts of the source code into one or more object files, in one example. Furthermore, the compiling of the one or more parts of the source code can comprise converting the one or more parts of the source code into the final executable file or the further final executable file. Hence, in some examples, the term "compiling" may also involve linking of object files to produce an executable file.

The compiler may be designed to compile the source code dependent on the source code and dependent on how the compiler options are set, i.e., adjusted, for compiling the source code. In these embodiments, the term "compiler optimization setting" is used to describe such an adjustment, i.e., setting, of the compiler. Generally, the compiler optimization setting can prescribe which level of optimization the compiler applies for compiling the source code or for compiling one or more specified parts of the source code, e.g., the first and/or the second part. The compiler can comprise various optimization options to apply various levels of optimization. The compiler optimization options can comprise an automatic function in-lining and a loop unrolling, for example.

Furthermore, in another example, the compiler optimization options can comprise a loop unrolling combined with a reordering of activities and/or a partial function in-lining. In the latter case, the function can be divided into a core and a further part, wherein the further part of the function can be in-lined. Furthermore, the compiler optimization options can comprise a reordering of logic blocks of the source code.

Accordingly, the compiler optimization setting, in the following also referred to as compiler setting, can prescribe which optimization option of the compiler is applied for compiling the source code. In addition, or alternatively, the compiler setting can prescribe which optimization option of the compiler is applied for compiling the one or more specified parts of the source code. The compiler setting can be specified by a compiler option flag of a compiling command for executing the compiler on the computer system.

In one example, the compiler option flag can be in the form of the "-O0"-flag of the gcc-compiler specifying that all or most of the optimization options are disabled, the "-O1"-flag of the gcc-compiler specifying that at least an optimization option is applied for guessing a probability of an "if-branch" and/or a first further optimization option is applied for in-lining functions which are called only once, the "-O2"-flag of the gcc-compiler specifying that at least a second further optimization option is applied for in-lining functions independently of how often they are called, the "-O3"-flag of the gcc-compiler specifying that at least a third further optimization option is applied for unrolling loops, the "-Os"-flag of the gcc-compiler specifying that a fourth further optimization option is applied for compiling the source code such that a size of the compiled version of the source code is as small as possible, or the "-Og"-flag of the gcc-compiler specifying that all or most of the optimization options are disabled. Compared to the "-O0"-flag, the "-Og"-flag can produce an executable file which is easier to debug as some compiler passes that collect debug information may be disabled if the "O0"-flag is enabled.

The "-O0"-flag, the "-O1"-flag, the"-O2"-flag and the"-O3"-flag can form an ordered list. According to the ordered list, a level of optimization of the compiler which can be performed by the compiler by appending one of the flags of the list to the compiling command and executing this command increases from the "-O0"-flag to the"-O3"-flag. Alternatively, the ordered list can comprise the "-Og"-flag instead of the "-O0"-flag.

The computer system can execute the compiler applying the optimization options of the compiler prescribed by the compiler option flag in response to reading the compiling command including the compiler option flag. Hence, in these embodiments, the term "applying a compiler setting for compiling" can describe setting the compiler such that one or more of the optimization options of the compiler described above for compiling the source code or the one or more specified parts of the source code by means of the compiler are enabled or disabled dependent on the compiler setting. The setting of the compiler may be performed by appending one of the compiler option flags described above to the compiling command, for example.

Similarly, the term "applying an optimization level for compiling" can describe executing the compiler, wherein the compiler is set such that one or more of the optimization options of the compiler described above are enabled or disabled dependent on the optimization level. In one example, applying a first optimization level can mean appending the "-O1"-flag to the compiling command and executing the compiling command. In one example, applying a second optimization level can mean appending the "-O2"-flag to the compiling command and executing the compiling command. In one example, applying a third optimization level can mean appending the "-O3"-flag to the compiling command and executing the compiling command.

In one example, appending the "-O0"-flag or the "-Og"-flag to the compiling command can mean disabling all optimization options of the compiler. In some cases, the compiler can perform basic optimizations although the compiler is executed using the "-O0"-flag or the "-Og"-flag. In these embodiments, the basic optimizations are not considered as a part of the optimization options of the compiler as the basic optimizations are not optional. Accordingly, disabling all optimization options of the compiler does not necessarily mean disabling all optimizations of the compiler.

The first, second, third and fourth optimization level can form an ordered list of optimization levels with the fourth level being the highest and the first level being the lowest level. However, the first level can involve more optimization options than using the "-O0"-flag or the "-Og"-flag. Thus, in the following appending the "-O0"-flag or the "-Og"-flag may be referred to as disabling all optimization options.

Thus, according to one example, applying the higher optimization level of the compiler for compiling the main performance part than for compiling the remaining part of the source code can involve applying the first, second, third or fourth optimization level for compiling the main performance part and disabling all optimization options for compiling the remaining part of the source code.

The first part and the second part of the source code can each comprise several modules and/or functions of the source code. The first part and the second part can represent separate units of the source code which can be compilable independently from each other. Furthermore, the first part and the second part can be compilable independently from each other such that a different compiler optimization setting is applicable for each part. Compiling the first part can result in a first object file or several first object files. Similarly, compiling the second part can result in a second object file or several second object files. The compiling of the source code can comprise compiling the first part and the second part separately to generate the first and second object file. Furthermore, the compiling of the source code can involve linking the first object file and the second object file in order to generate the final executable file or the further final executable file.

In one example, the computer system can perform the splitting dependent on user input data. According to this example, a knowledge of the source code can be used for the splitting. In another example, the computer system can perform the splitting dependent on respective sizes of the modules and/or functions of the source code. For example, the computer system can perform the splitting such that a total size of the modules and functions of the first part is approximately equal to a total size of the modules and functions of the second part. In a further example, the computer system can perform the splitting randomly. Generally, the computer system can split the source code into at least the first part and the second part such that the first part and the second part are compilable separately from each other.

Applying the at least two different compiler settings for compiling the first part can involve applying two different optimization levels for compiling the first part. Applying one of the two different optimization levels for compiling the first part can be provided by compiling the first part such that all optimization options are disabled. Applying another one of the two different optimization levels can be provided by compiling the first part such that either the "–01"-flag, the "-02"-flag or the "-03"-flag is enabled when reading the compiling command.

Similarly, applying the at least two different compiler settings for compiling the second part can involve applying two different optimization levels for compiling the second part. Applying one of the two different optimization levels for compiling the second part can be provided by compiling the second part such that all optimization options are disabled. Applying another one of the two different optimization levels can be provided by compiling the second part such that either the "-01"-flag, the "-02"-flag or the "-03"-flag is enabled when reading the compiling command.

In one example, embodiments can comprise applying a first compiler setting for the first part and a second compiler setting for the first part for generating the at least two different executable files. Similarly, embodiments can comprise applying a first compiler setting for the second part and a second compiler setting for the second part for generating the at least two different executable files.

It can be assumed that the at least two different executable files comprise at least a first executable file and a second executable file. Thus, the generating of the first executable file can comprise applying the first compiler setting for the first part for compiling the first part. Furthermore, the generating of the second executable file can comprise applying the second compiler setting for the first part for compiling the first part. As the first compiler setting for the first part is different to the second compiler setting for the first part, applying the first compiler setting for the first part can provoke applying a higher optimization level for compiling the first part by the compiler compared to applying the second compiler setting for the first part or vice versa.

The same can hold for compiling the second part. Accordingly, the generating of the first executable file can comprise applying the first compiler setting for the second part for compiling the second part. Furthermore, the generating of the second executable file can comprise applying the second compiler setting for the second part for compiling the second part. As the first compiler setting for the second part is different to the second compiler setting for the second part, applying the first compiler setting for the second part can provide applying a higher optimization level for compiling the second part by the compiler compared to applying the second compiler setting for the second part or vice versa.

Applying the at least two different compiler optimization settings for compiling the first part and for compiling the second part can allow the determination of an influence of the first part on the target quantity and an influence of the second part on the target quantity.

According to one example, the first compiler setting for the first part can correspond to a higher optimization level than the second compiler setting for the first part. According to this example, applying the first compiler setting for the first part can involve setting the compiler option flag equal to the 01-flag, the 02-flag or the 03-flag and applying the second compiler setting for the first part can involve setting the compiler option flag equal to the 00-flag or the 0g-flag.

Furthermore, according to the previous example, the first compiler setting for the second part can correspond to a lower optimization level than the second compiler setting for the second part. Further, according to this example, applying the second compiler setting for the second part can involve setting the compiler option flag equal to the 01-flag, the 02-flag or the 03-flag and applying the first compiler setting for the second part can involve setting the compiler option flag equal to the 00-flag or the 0g-flag. A combination as described above of the first and second compiler setting for the first and the second part, in the following can be referred to as a first combination of compiler settings, can be useful if only the first and the second executable file are generated for determining the main performance part. It should be noted that the first combination of compiler settings can allow a determination of the influence of the first part on the target quantity and the influence of the second part on the target quantity by generating only the two executable files.

The embodiments can determine the influence of the first part and the second part on the target quantity by performing a comparison between the value of the target quantity of the first executable file, in the following also referred to as first target value, and the value of the target quantity of the second executable file, in the following also referred to as second target value.

In a case in which the respective value of the target quantity of each executable file is the execution time of the respective executable file, the first target value can be a first execution time and the second target value can be a second execution time. In one example, the computer system can run the first and the second executable file and measure the first and second execution time.

In one example, the embodiments can determine the influence of the first part and the influence of the second part on the target quantity by determining an influence value of the first part and an influence value of the second part. In a case in which the first combination of compiler settings is applied, the influence value of the first part can be equal to the reciprocal value of the first execution time and the influence value of the second part can be equal to the reciprocal value of the second execution time.

According to one embodiment, the first part can be designed in the form of a first batch of several units of the source code and the second part can be designed in the form a second batch of several units of the source code. The units of the first batch can be compilable separately from each other and the units of the second batch can be compilable separately from each other. The units of the first batch can be first compiling units and the units of the second batch can be second compiling units. This embodiment can allow the splitting of the first and the second part into the respective compiling units which are compilable separately from each other. Accordingly, this embodiment can enable repeated splitting of the source code, the generating of at least two different executable files, the determining of the respective value of the target quantity of the at least two different executable files and the determining of the main performance part.

According to one embodiment, a reference executable file can be generated. The generating of the reference executable file can comprise applying at least one optimization option of the compiler for compiling each part of the source code. For example, the "02"-flag can be used for compiling each part of the reference executable file. In one example, the generating of the reference executable file can comprise applying the same optimization option of the compiler for compiling parts of the source code. The embodiments can further comprise determining a value of the target quantity for the reference executable file. For example, an execution time of the reference executable file can be determined. According to this embodiment, the determining of the main performance part can comprise comparing the respective value of the target quantity of the at least two different executable files, for example the first and the second executable file, with the value of the target quantity of the reference executable file. This embodiment can provide estimation of the influence of the first part and the second part on the target quantity in an easier manner compared to an embodiment in which the first combination of compiler settings is applied as described above. In most cases, a difference of the respective value of the target quantity of the first and the second executable file to the value of the target quantity of the reference executable file can be higher than a difference of the value of the target quantity of the first executable file and the value of the target of the second executable file.

According to one embodiment, the method can further comprise performing splitting of the source code, generating of at least two different executable files, determining the respective value of the target quantity, and determining the main performance part automatically. Accordingly, this embodiment does not require a knowledge of logic or content of the source code to generate the compiled version of the source code. In one example, the processor can run a shell script to perform the splitting of the source code, the generating of the at least two different executable files, the determining of the respective value of the target quantity and the determining of the main performance part automatically.

According to one embodiment, the compiling of the source code can comprise applying at least one optimization option of the compiler for compiling the main performance part and disabling all optimization options of the compiler for compiling the remaining part of the source code. The disabling of all optimization options can allow debugging of the remaining part of the source code in an easier manner.

Accordingly, an embodiment can further comprise performing repeated iterations. The iterations can comprise splitting the main performance part of the source code, resulting in at least a first part and a second part of the main performance part. Furthermore, iterations can comprise generating at least two respective different executable files, referred to herein as executable files of the respective iteration. The generating of the executable files of the respective iteration can comprise applying at least one new compiler optimization setting for compiling the first part of the main performance part and applying at least one new compiler optimization setting for compiling the second part of the main performance part.

In one example, the applying of the new compiler optimization setting for compiling the first part of the main performance part can be realized by using a different compiler optimization flag for the compiling of the first part compared to a compiling process of the first part in a previous iteration. Similarly, the applying of the new compiler optimization setting for compiling the second part of the main performance part can be realized by using a different compiler optimization flag for the compiling of the second part compared to a compiling process of the second part in a previous iteration.

In one example, when generating a first executable file of the executable files of the respective iteration, the second part of the main performance part of the respective iteration and respective remaining parts of the source code can be compiled using an unchanged compiler optimization setting compared to a previous iteration in case the new compiler optimization setting is applied for compiling the first part of the main performance part. The respective remaining parts of the source code can be the parts of the source code which do not include the main performance part of the respective iteration.

Analogously, when generating a second executable file of the executable files of the respective iteration, the first part of the main performance part and the respective remaining parts of the source code can be compiled using an unchanged compiler optimization setting compared to the previous iteration in case the new compiler optimization setting is applied for compiling the second part of the main performance part.

Furthermore, each iteration can comprise determining a respective value of the target quantity for each executable file of executable files of the respective iteration. Furthermore, each iteration can comprise determining a respective new main performance part, wherein the respective new main performance part can be a part of the at least first part and the second part of the main performance part that can have a greater influence on the target quantity with respect to the new compiler optimization settings. The respective new main performance part can be the main performance part of a subsequent iteration. In other words, in an actual iteration, the splitting of the main performance part can involve splitting the new main performance part of a preceding iteration.

The compiling of the source code for generating the compiled version of the program source code can comprise applying a higher optimization level of the compiler for compiling the new main performance part of a last iteration of the iterations than for compiling a remaining rest of the source code. According to this embodiment, the source code can be split into the new main performance part of the last iteration and the remaining rest of the source code. The remaining rest of the source code can exclude the new main performance part of the last iteration and can include all the parts of the source code except the new main performance part of the last iteration. In other words, according to this embodiment, the new main performance part of the last iteration can be compiled using the higher optimization level of the compiler instead of compiling the main performance part using the higher optimization level of the compiler as described according to the aforementioned embodiments.

A first iteration of the iterations can involve splitting the source code into at least a first part and a second part as described above. In this case, generating of the executable files of the first iteration can involve generating at least two different executable files described above, e.g., the first and the second executable file mentioned above. In this case, the determining of the new main performance part can be the determining of the main performance part, because there may be no main performance part when starting the first iteration.

In another example, the first iteration can involve splitting the main performance part which is determined to be dependent on the values of the target quantity of the at least two different executable files, e.g., the first and the second executable file mentioned above. In this case, the first iteration can be considered as a repetition of the splitting of the source code, of the generating of the at least two different executable files, of the determining of the respective value of the target quantity of the at least two different executable files and of the determining of the main performance part described above.

Performing the iterations can have an advantage that a size of the main performance part is successively reduced with new iterations. Accordingly, the remaining rest of the source code which is compiled with a lower optimization level than the main performance part of the last iteration is successively increasing with new iterations. Hence, this embodiment can allow an increase in the number of parts of the source code which are compiled without using an optimization option of the compiler. Accordingly, these embodiments can enable an increase in size of that part of the source code which is easy to debug. On the other hand, this embodiment can allow determination of the main performance part of the last iteration as a most important part of the source code with respect to the target quantity and to compile the source code such that the compiled version of the source code is optimized with respect to the target quantity on the one hand and with respect to debuggability on the other hand.

According to one embodiment, the iterations can be performed until one of the values of the target quantity, of the at least two respective different executable files, reaches a performance threshold. This can have an advantage that the value of the target of at least one of the at least two respective different executable files is below or above the performance threshold depending on whether the performance threshold is reached from below or above the threshold. The same can be said for the compiled version of the source code. Accordingly, this embodiment can enable an increase in the size of that part of the source code which is easy to debug such that an execution time or a file size of the compiled version of the source code can be below the performance threshold. In other words, this embodiment can allow compiling of as many parts of the source code as possible without using an optimization option of the compiler on the one hand and obtaining an execution time or a file size of the compiled version of the source code which is below the performance threshold on the other hand.

Reaching the performance threshold can comprise reaching the performance threshold from above or from below depending on the target quantity. For example, if the target quantity is the code execution time, then reaching the performance threshold can imply reaching the performance threshold from below. Thus, an average code execution time of the at least two respective different executable files, which are generated in each iteration, may increase with subsequent iterations. This is due to the fact, that the size of the main performance part is reduced with subsequent iterations. Among many other features, this embodiment can solve the problem of finding the compiled version of the source code such that it is as fast as possible, i.e., such that its execution time is below the performance threshold, and such that it is as easy to debug as possible, simply reducing the execution time in each subsequent iteration does not solve this problem.

If the target quantity is the file size, then reaching the performance threshold can imply reaching the performance threshold from below as well.

According to one embodiment, the iterations can be performed until a number of compilable units of the new main performance part reaches a given minimal number, i.e., minimum number. This embodiment can provide the capability to split the source code in a refined manner with a high resolution. The resolution can be defined by a predetermined minimal number.

According to one embodiment, the generating of the at least two respective different executable files in each iteration can comprise generating a respective first executable file and a respective second executable file. The generating of the respective first executable file can comprise disabling all optimization options of the compiler for compiling the first part of the main performance part of each iteration and applying at least one optimization option of the compiler for compiling the second part of the main performance part of each iteration. The generating of the respective second executable file can comprise disabling all optimization options of the compiler for compiling the second part of the main performance part of each iteration and applying at least one optimization option of the compiler for compiling the first part of the main performance part of each iteration. If all optimization options of the compiler are disabled for compiling the first part or the second part, then the respective influence of the first part and the second part on the target value can be determined in an easier manner. Disabling all optimization options of the compiler can involve setting the compiler option flag equal to the "0g"-flag or the "O0"-flag.

According to one embodiment, the generating of the at least two respective different executable files in each iteration can comprise generating a respective first executable file and a respective second executable file. According to this embodiment, the generating of the respective first executable file can comprise disabling all optimization options of the compiler for compiling the first part of the main performance part of each iteration and applying all optimization options of the compiler for compiling the second part of the main performance part of each iteration. Furthermore, according to this embodiment, the generating of the respective second executable file can comprise disabling all optimization options of the compiler for compiling the second part of the main performance part of each iteration and applying all optimization options of the compiler for compiling the first part of the main performance part of each iteration.

If all optimization options of the compiler are disabled for compiling the first part and all optimization options are applied for compiling the second part when generating the respective first executable file, and all optimization options are disabled for compiling the second part and all optimization options are applied for compiling the first part when generating the respective second executable file, then the respective influence of the first part and the second part on the target value can be determined with the least effort. Applying all optimization options of the compiler can involve setting the compiler option flag equal to the "O3"-flag.

Accordingly, an embodiment can further comprise generating the reference executable file as described above. According to this embodiment, the determining of the respective new main performance part in each iteration can comprise comparing the respective value of the target quantity of the at least two respective different executable files of each iteration with the value of the target quantity of the reference executable file.

The value of the target quantity of the reference executable file can be considered as an absolute value. Comparing the respective value of the target quantity of the at least two respective different executable files of each iteration with the absolute value can allow determination of the influence of the first part and the second part of the main performance part in each iteration on the target quantity in an easier manner with respect to comparing the values of the target quantity of the at least two respective different executable files with each other.

Accordingly, embodiments can further comprise performing repeated iterations. Iterations can comprise splitting the main performance part of the source code into multiple parts. The multiple parts can comprise several units of the source code, wherein the units of the parts are compilable separately from each other. Furthermore, iterations can comprise generating respective executable files, in the following referred to as executable files of the respective iteration. These executable files of the respective iteration can be associated with one respective part of the multiple parts. The term "associated" can indicate that the respective executable file of the executable files of the respective iteration is generated such that a compiler optimization setting is changed with respect to that part of the multiple parts the respective executable file of the executable files of the associated respective iteration.

The generating of the respective executable file of the executable files of the respective iteration can comprise applying a new compiler optimization setting for compiling the respective part which is associated with the respective executable file of the executable files of the respective iteration. The new compiler optimization setting for compiling the respective part which can be associated with the respective executable file of the executable files of the respective iteration can be new, compared to a compiler optimization setting for compiling this respective part in the previous iteration of the iterations. In one example, applying the new compiler optimization setting for compiling the respective part which is associated with the respective executable file of the executable files of the respective iteration can involve using a different compiler optimization flag for compiling this respective part compared to a compiling process of that part in the previous iteration.

Furthermore, according to this embodiment, the generating of the respective executable file of the executable files of the respective iteration can comprise applying an unmodified compiler optimization setting for compiling the respective remaining parts of the main performance part of the respective iteration.

The unmodified compiler optimization setting for compiling the respective remaining parts of the main performance part of the respective iteration can be unmodified compared to a compiler optimization setting for compiling these respective remaining parts in the previous iteration of the iterations.

Generally, respective executable files which are generated in a respective iteration of the iterations can be an executable file of the whole source code. A respective remaining rest of the source code which does not include the main performance part can be compiled using an unmodified compiler optimization setting compared to the previous iteration of the respective iteration when generating the respective executable files of the respective iteration.

Furthermore, according to this embodiment, iterations can comprise determining a respective value of the target quantity for executable files of the respective iteration.

Iterations can further comprise determining a respective new main performance part, wherein the respective new main performance part can be the part of the multiple parts of the main performance part that has the greatest influence on the target quantity with respect to the new compiler optimization settings of the multiple parts. The respective new main performance part can be the main performance part of a subsequent iteration of the respective iteration.

The compiling of the source code for generating the compiled version of the program source code can comprise applying a higher optimization level of the compiler for compiling the new main performance part of a previous iteration of the iterations than for compiling a remaining rest of the source code. This remaining rest of the source code can comprise all parts of the source code except the new main performance part of a previous iteration.

Splitting the main performance part into multiple parts, e.g., at least three parts, can provide that one of the values of the target quantity of the executable files of the respective parts of the main performance part reaches the performance threshold faster compared to an embodiment according to which the main performance part is split into two parts. In one example, iterations can be performed until one of the values of the target quantity of the executable files of a previous iteration reaches a performance threshold. In another example, iterations can be performed until one or more compilable units of the new main performance part reaches a minimal number.

According to one embodiment, the determining of the main performance part can comprise solving an optimization problem based on a target function. A value of the target function can be dependent on parts of the source code which are compiled such that all optimization options of the compiler are disabled, hereinafter referred to as non-optimized parts. According to this embodiment, the solving of the optimization problem can comprise maximizing the number of the non-optimized parts of the source code such that a value of the target quantity for the compiled version of the program source code is less than a further performance threshold. In one example, the further performance threshold can be the performance threshold described above. In one example, the optimization problem can be formulated in the form of a constrained optimization problem according to which the target function can depend on the number of non-optimized parts and can also comprise a penalty term. The penalty term can penalize if a part of the source code which has a high influence on the target quantity compared to further parts of the source code is not compiled using at least one optimization option of the compiler.

Analogously, the solving of the optimization problem can comprise minimizing the number of optimized parts of the source code such that a value of the target quantity for the compiled version of the program source code is less than a further performance threshold. The optimized parts can be the parts of the source code which are compiled using at least one compiler optimization option.

In one example, the target function can comprise a weighted sum, wherein each weight of the sum corresponds to a weighting of one of the optimized parts. The weighting of the respective optimized parts can depend on a respective influence of the respective part on the target quantity. In one example, an embodiment can perform an approximation of the target function. The embodiment can approximate the target function dependent on the respective value of the target quantity of executable files of the at last two different executable files. In one example, the embodiment can approximate the target function dependent on a database and the source code. For example, the source code can be compared with further source codes and their values of the target quantities. Such a comparison can be realized by comparing a number of the modules and/or the functions and/or sizes of the modules and/or the functions of the source code with those of the further source codes.

According to one embodiment, the splitting of the source code can comprise splitting the source code into several parts, wherein the several parts comprise the first part and the second part. Furthermore, according to this embodiment, the generating of the at least two different executable files can comprise generating a respective executable file corresponding to a respective part of the several parts of the source code. According to this embodiment, the generating of the respective executable file can comprise applying a reference compiler optimization setting for compiling the several parts except for the respective part. Furthermore, according to this embodiment, the generating of the respective executable file can comprise applying a respective further compiler optimization setting for compiling the respective part. The respective further compiler optimization setting can represent a compiler optimization setting for applying a lower optimization level compared to the reference compiler optimization setting. According to this embodiment, the determining of the respective value of the target quantity can comprise determining a value of the target quantity for the respective executable file. Furthermore, the embodiment can further comprise sorting the values of the target quantity of the executable files. According to this embodiment, the determining of the main performance part can comprise determining the main performance part such that the main performance part comprises the part of the several parts having the smallest value of the target quantity. This embodiment can be advantageous if a portion of the compiling units of the source code are comparatively small. In this case, the sorting of the values of the target quantity of the executable files can provide a quick overview of a respective influence of the parts on the target quantity with respect to a variation of a compiler optimization setting.

According to one embodiment, the source code can comprise respective units. The respective units can be compiling units which are compilable separately from each other. According to this embodiment, the splitting of the source code can comprise discarding a part of the units dependent on profiling data. The profiling data can indicate a respective workload of the units produced during a preceding execution of a further compiled version of the source code. In one example, the respective workload of the units can be determined dependent on a count of floating-point operations which can be used to process the respective units on the processor or a further processor. Alternatively, or in addition, the respective workload of the units can be determined dependent on a probability of how often the respective units are called during the preceding execution of the further compiled version of the source code.

The discarding can comprise discarding the units which together produced the least workload during the preceding execution of the further compiled version of the source. Accordingly, this embodiment can further comprise appending the discarded units to the remaining part of the source code. This embodiment can provide the ability to direct an optimization of a compiling process of the source code to the units of the source code which are either often processed or require comparatively greater amounts of computing power. This may be beneficial for compiling as many units of the source code as possible without using an optimization option of the compiler on the one hand and obtaining an execution time of the compiled version of the source code which is below the performance threshold on the other hand.

According to one embodiment, the source code can comprise respective units. The respective units can be compiling units which are compilable separately from each other. According to this embodiment, the splitting of the source code can comprise discarding a part of the units dependent on debugging data. The debugging data can indicate a respective debugging activity for the units for analyzing a preceding execution of a further compiled version of the source. The respective debugging activity can be recorded during a debugging of the source code by a developer of the source code. According to this embodiment, the discarding can comprise discarding the units corresponding together to the highest debugging activity. The embodiment can further comprise appending the discarded units to the remaining part of the source code. This embodiment can provide the capability to direct an optimization of a compiling process to the units of the source code which are rarely debugged. This can be beneficial for compiling as many units of the source code which are comparatively often debugged as possible without using an optimization option of the compiler on the one hand and obtaining an execution time of the compiled version of the source code which is below the performance threshold on the other hand.

According to one embodiment, the embodiments can be further configured for performing repeated iterations.

Iterations can comprise splitting the main performance part of the source code resulting in at least a first part and a second part of the main performance part. Furthermore, each iteration can comprise generating at least two respective different executable files, subsequently referred to as executable files of the respective iteration. The generating of the executable files of the respective iteration can comprise applying at least one new compiler optimization setting for compiling the first part of the main performance part and applying at least one new compiler optimization setting for compiling the second part of the main performance part. The embodiments can be configured to generate the executable files of the respective iteration and to apply the at least one new compiler optimization setting for compiling the first part of the main performance part and to apply the at least one new compiler optimization setting for compiling the second part of the main performance part.

The embodiments can be configured to apply the new compiler optimization setting for compiling the first part of the main performance part by processing a different compiler optimization flag for the compiling of the first part compared to a compiling process of the first part in a previous iteration. Similarly, the embodiments can be configured to apply the new compiler optimization setting for compiling the second part of the main performance part by using a different compiler optimization flag for the compiling of the second part compared to a compiling process of the second part in a previous iteration.

In one example, when generating the first executable file of the executable files of the respective iteration, an embodiment can compile the second part of the main performance part of the respective iteration and respective remaining parts of the source code using an unchanged compiler optimization setting compared to the previous iteration in the case the embodiment applies the new compiler optimization setting for compiling the first part of the main performance part. The respective remaining parts of the source code can be the parts of the source code which do not include the main performance part of the respective iteration.

Analogously, when generating the second executable file of the executable files of the respective iteration, the embodiment can compile the first part of the main performance part and the respective remaining parts of the source code using an unchanged compiler optimization setting compared to the previous iteration in case the embodiment applies the new compiler optimization setting for compiling the second part of the main performance part.

Furthermore, each iteration can comprise determining a respective value of the target quantity for executable files of the respective iteration. Furthermore, iterations can comprise determining a respective new main performance part, wherein the respective new main performance part is the part of the at least first part and the second part of the main performance part that has a greater influence on the target quantity with respect to the new compiler optimization settings. The respective new main performance part can be the main performance part of a subsequent iteration. In other words, in an actual iteration, the splitting of the main performance part comprises splitting the new main performance part of a preceding iteration.

The compiling of the source code for generating the compiled version of the program source code can comprise applying a higher optimization level of the compiler for compiling the new main performance part of a last iteration of the iterations than for compiling a remaining rest of the source code. Accordingly, the embodiment can split the source code into the new main performance part of the last iteration and the remaining rest of the source code. The remaining rest of the source code can exclude the new main performance part of the last iteration and include all the parts of the source code except the new main performance part of the last iteration. In other words, according to this embodiment, the embodiment can compile the new main performance part of the last iteration applying the higher optimization level of the compiler instead of compiling the main performance part using the higher optimization level of the compiler.

Embodiments of the present invention may be implemented using a computing device that may also be referred to as a computer system, a client, or a server. Referring now to FIG. 1, a schematic of an example of a computer system 10 is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

The computer system 10 may comprise a computer system/server 112. The computer system/server 112 may be operational with numerous other general purpose or special purpose computing system environments or configurations. Examples of well-known computing systems, environments, and/or configurations that may be suitable for use with the computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

The computer system/server 112 may be described in the general context of computer system executable instructions, such as program modules, being executed by a computer system. Generally, program modules may include routines, programs, objects, components, logic, data structures, and so on that perform particular tasks or implement particular abstract data types. The computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, the computer system/server 112 in computer system 10 is shown in the form of a general-purpose computing device. The components of the computer system/server 112 may include, but are not limited to, one or more processors or processing unit 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

System memory 28 can include computer system readable media in the form of volatile memory, such as random access memory (RAM) 30 and/or cache memory 32. Computer system/server 112 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 50, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 50 generally carry out the functions and/or methodologies of embodiments of the invention as described herein.

The term "program" or "program module" as used herein refers to a set of instructions which contains commands to provoke actions performed by the processor 16 when the processor 16 may read the commands. The set of instructions may be in the form of a computer-readable program, routine, subroutine or part of a library, which may be executed by the processor 16 and/or may be called by a further program being executed by the processor 16. Preferably, the program modules 50 may be executable programs which are compiled according to a type of hardware platform of the computer system/server 112.

Computer system/server 112 may also communicate with one or more external devices 14 such as a keyboard, a pointing device, a display 24, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 22. Still yet, computer system/server 112 can communicate with one or more networks such as a local area network (LAN), a general wide area network (WAN), and/or a public network (e.g., the Internet) via network adapter 20. As depicted, network adapter 20 communicates with the other components of computer system/server 112 via bus 18. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

A computer system such as the computer system 10 shown in FIG. 1 may be configured, and may be used, for performing operations and functions disclosed herein. For example, the computer system 10 may be configured for generating a first compiled version 100 of a program source code 1, in the following also referred to as first compiled version 100, by means of a compiler 51. In one example, the computer system 10 may store the source code 1 in the RAM 30.

Figure 2:
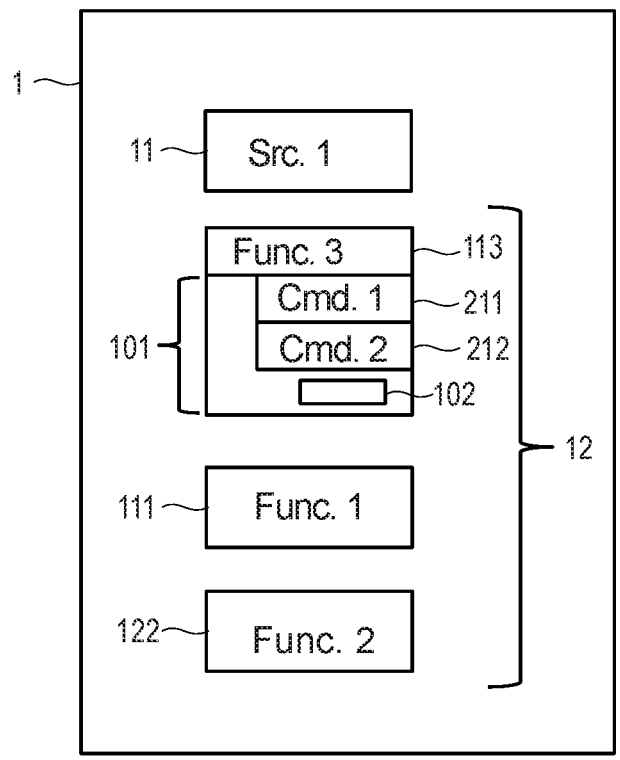
FIG. 2 depicts a block diagram schematically illustrating components of a source code.

According to a simple example, the program source code 1, depicted in FIG. 2, can comprise a first part 11 and a second part 12. The first part 11 can be an input module for reading input data comprising information via one of the external devices 14, for example the keyboard or the pointing device, and the I/O interface 22. The input data can be producible by a user of the computer system 10 using the keyboard and/or the pointing device. The second part 12 can be a data processing module for processing information of the input data. The second part 12 can comprise a data preprocessing function 113, a first function 111 and a second function 122 and a loop 101 which comprises a stop criterion 102. The data preprocessing function 113 can be configured to convert the input data in a compatible data format such that the first function 111 is able to process the information given by the input data. The first function 111 can be configured to generate an output. Commands of the loop 101 can be configured to direct the output of the first function 111 to the second function 122. In one example, the data preprocessing function 113 can accept only prescribed types of data structures as input values for the data preprocessing function 113. The input module can be configured to convert the information of the input data into one of the prescribed types of data structures.

A single iteration of the loop 101 can involve processing a calling command 211 for executing the first function 111 and a calling command 212 for executing the second function 122. The first part 11 and the second part 12 can each present units of the source code 1 which are compilable separately from each other.

The computer system 10 can be configured for performing a first, second, third, fourth, and fifth operation. In one example, the processor 16 can perform the first, second, third, fourth and fifth operation.

The first operation can comprise splitting the source code 1 into at least the first part 11 and the second part 12. In one example, the processor 16 can read the source code 1 until the end of the input module is reached and save the input module in form of the first part 11 in the cache memory 32. In response to saving the first part 11, the processor can read the further parts of the source code 1, i.e., the data preprocessing function 113, the first function 111 and the second function 122 and the loop 101 and can save the further parts in the form of the second part 12 in the cache memory 32. In another example, not shown in the figures, the processor 16 can split the source code 1 such that a file size of the first part 11 can be approximately equal to a file size of the second part 12.

Figure 3:
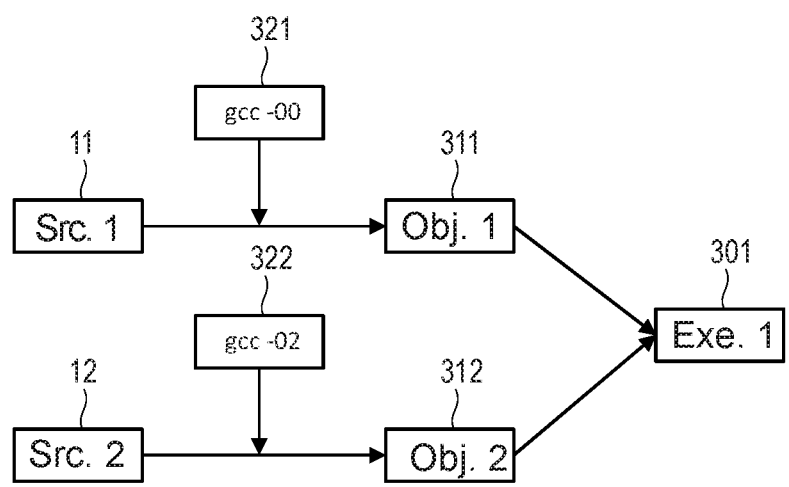
FIG. 3 depicts a block diagram schematically illustrating a generation of a first executable file of the source code shown in FIG. 2.
Figure 4:
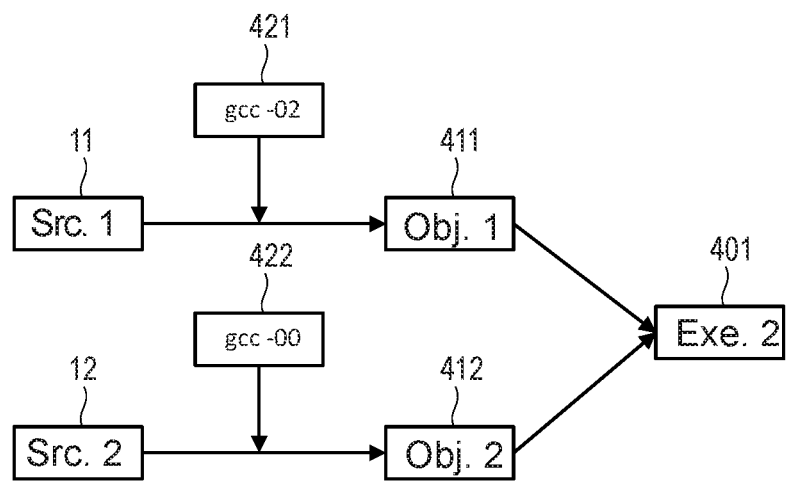
FIG. 4 depicts a block diagram schematically illustrating a generation of a second executable file of the source code shown in FIG. 2.

The second operation may comprise generating at least two different executable files of the source code 1, for example a first executable file 301 and a second executable file 401 as depicted in FIG. 3 and in FIG. 4. The generating of the at least two different executable files 301, 401 can comprise applying at least two different compiler optimization settings for compiling the first part 11 and applying at least two different compiler optimization settings for compiling the second part 12.

In one example, the compiler 51 can generate a first object file 311 by compiling the first part 11 using a first compiler setting 321 for the first part 11 and can generate a second object file 312 by compiling the second part 12 using a first compiler setting 322 for the second part 12. Furthermore, the compiler 51 can link the first object file 311 with the second object file 312 to produce the first executable file 301.

Analogously, the compiler 51 can generate a further first object file 411 by compiling the first part 11 using a second compiler setting 421 for the first part 11 and can generate a further second object file 412 by compiling the second part 12 using a second compiler setting 422 for the second part 12. Furthermore, the compiler 51 can link the further first object file 411 with the further second object file 412 to produce the second executable file 401.

The first compiler setting 321 for the first part 11 can comprise the gcc command "gcc-O0" for prescribing that all optimization options of the compiler 51 are turned off for compiling the first part 11. The first compiler setting 322 for the second part 12 can comprise the gcc command "gcc-O2" for prescribing that all optimization options of the compiler 51 are enabled for compiling the second part 12.

The second compiler setting 421 for the first part 11 can comprise the gcc command "gcc-O2" for prescribing that all optimization options of the compiler 51 are turned on for compiling the first part 11. The second compiler setting 422 for the second part 12 can comprise the gcc command "gcc-O0" for prescribing that all optimization options of the compiler 51 are disabled for compiling the second part 12.

The processor 16 can apply the different compiler settings 321, 322, 421 and 422 for a respective compiling of the first part 11 and the second part 12 by processing the different compiling commands "gcc-O0", "gcc-O2", "gcc-O2" and "gcc-O0" respectively together with the compiler 51. The compiler 51 can be an executable file which may be operatable on the processor 16.

The third operation can comprise determining a respective value of a target quantity for each executable file of the at least two different executable files 301, 401. In one example, the target quantity can be an execution time. In this case, the processor 16 can run the first executable file 301 and measure an execution time of the first executable file 301, subsequently referred to as first execution time. Similarly, the processor 16 can run the second executable file 401 and measure an execution time of the second executable file 401, subsequently referred to as second execution time. According to another example, the target quantity can be a file size. In this case, the processor 16 can save a first file size of the first executable file 301 and a second file size of the second executable file 401 in the cache memory 32.

The fourth operation can comprise determining a first main performance part of the source code 1 dependent on the values of the target quantity of the at least two different executable files 301, 401. The first main performance part is the part of the at least first part 11 and the second part 12 that has a greater influence on the target quantity with respect to the different compiler optimization settings 321, 322, 421 and 422. For example, if the second execution time is greater than the first execution time, then the second part 12 can have the greater influence on the target quantity with respect to the different compiler optimization commands "gcc-O0" and "gcc-O2." According to this example, the processor 16 can determine the second part 12 as the first main performance part of the source code 1.

Figure 5:
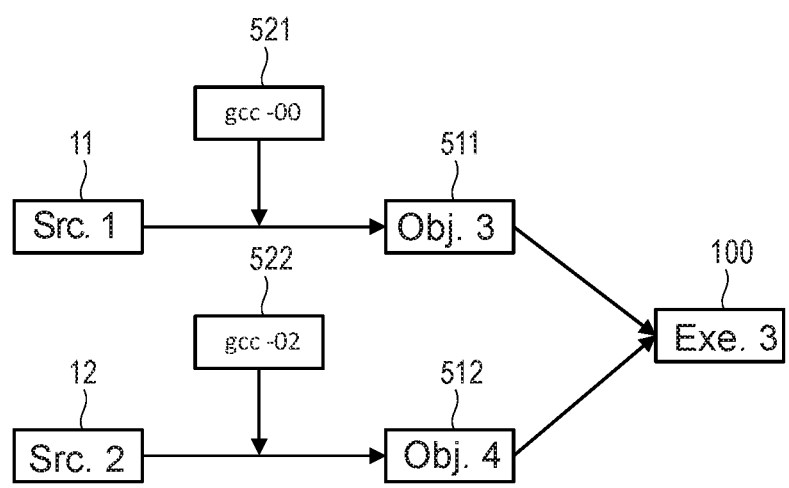
FIG. 5 depicts a block diagram schematically illustrating a generation of a first compiled version of the source code shown in FIG. 2.

The fifth operation can comprise generating the first compiled version 100 of the program source code 1 by compiling the source code 1, as depicted in FIG. 5. The compiling of the source code 1 can comprise applying a higher optimization level of the compiler 51 for compiling the first main performance part than for compiling the remaining part of the source code 1. The remaining part can be the first part 11 according to example described above.

The processor 16 can generate a third object file 511 by compiling the first part 11 by the compiler 51 using a third compiler setting 521 for the first part 11 and a fourth object file 512 by compiling the second part 12 using a fourth compiler setting 522 for the second part 12. Furthermore, the processor 16 can link the third object file 511 with the fourth object file 512 to produce the first compiled version 100 of the program source code 1. According to the example described above, the third compiler setting 521 for the first part 11 can comprise the gcc command "gcc-O0" for prescribing that all optimization options of the compiler 51 are turned off for compiling the first part 11. The fourth compiler setting 522 for the second part 12 can comprise the gcc command "gcc-O2" for prescribing that all optimization options of the compiler 51 are enabled for compiling the second part 12.

Figure 6:
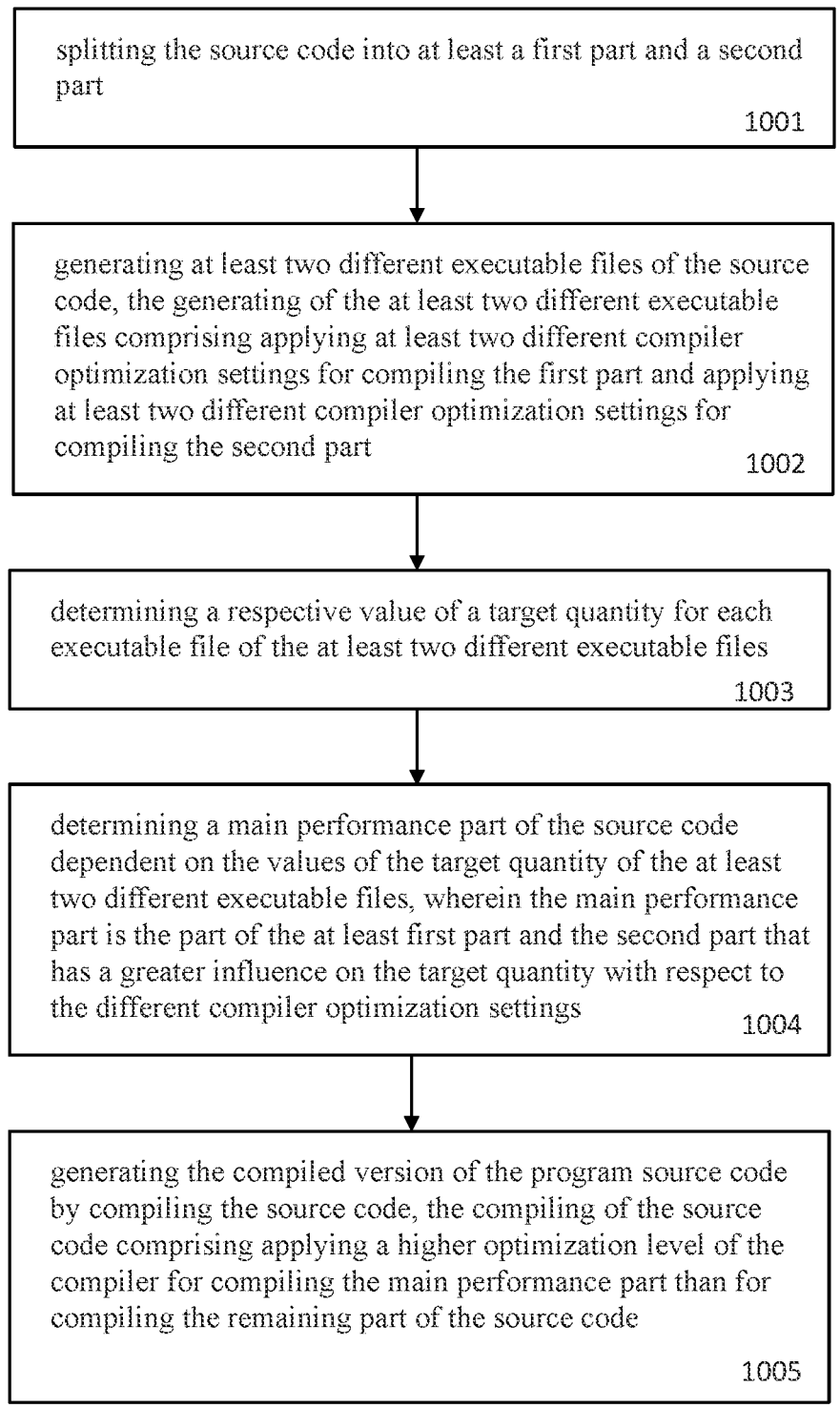
FIG. 6 depicts a flowchart of a method for obtaining the first compiled version of the source code shown in FIG. 5.

FIG. 6 depicts a flowchart of a method for generating the first compiled version 100 of the program source code 1 by the compiler 51. The embodiment can be performed by the computer system 10.

In step 1001, the computer system 10 can split the source code 1 into at least the first part 11 and the second part 12.

In step 1002, the computer system 10 can generate at least two different executable files of the source code 1, e.g., the first executable file 301 and the second executable file 401. The generating of the at least two different executable files 301, 401 can comprise applying at least two different compiler optimization settings for compiling the first part 11 and applying at least two different compiler optimization settings for compiling the second part 12.

In step 1003, the computer system 10 can determine the respective value of the target quantity for the at least two different executable files 301, 401, e.g., the first and the second execution time.

In step 1004, the computer system 10 can determine the first main performance part of the source code 1 dependent on the values of the target quantity of the at least two different executable files 301, 401. The first main performance part can be the part of the at least first part 11 and the second part 12 that has a greater influence on the target quantity with respect to the different compiler optimization settings 321, 322, 421 and 422.

In step 1005, the computer system 10 can generate the first compiled version 100 of the program source code 1 by compiling the source code 1. The compiling of the source code 1 can comprise applying a higher optimization level of the compiler 51 for compiling the first main performance part than for compiling the remaining part of the source code 1.

According to one example, the computer system 10 can be configured to generate a reference executable file. The generating of the reference executable file can comprise applying at least one optimization option of the compiler 51 for compiling parts of the source code 1. For example, the compiler 51 can compile the source code 1 using the "-O1"-flag or the "-O2"-flag for the parts, for example the first part 11 and the second part 12, to compute the reference executable file. Furthermore, the computer system 10 can be configured to determine a value of the target quantity for the reference executable file. In one example, the processor 16 can run the reference executable file and measure an execution time of the reference executable file, subsequently referred to as reference execution time. In one example, the computer system 10 can determine the first main performance part of the source code 1 dependent on the values of the target quantity of the two different executable files 301, 401 and the reference execution time. For example, if the first execution time is closer to the reference execution time than the second execution time, then the second part 12 can be selected as the first main performance part. For example, if the second execution time is closer to the reference execution time than the first execution time, then the first part 11 can be selected as the first main performance part.

In one example, the computer system 10 can be configured to perform repeated iterations. The iterations can comprise an initial iteration and subsequent iterations. In one example, the computer system 10 can perform the initial iteration in response to generating the reference executable file.

Figure 7:
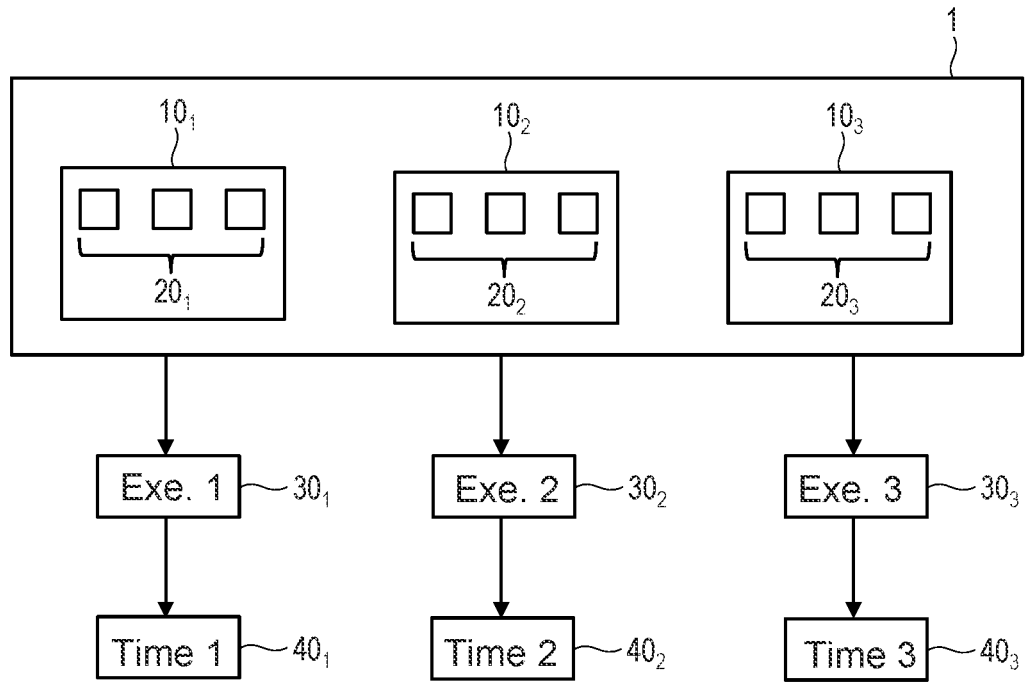
FIG. 7 depicts a block diagram schematically illustrating an initial iteration of several iterations for generating a compiled version of the source code shown in FIG. 2.

FIG. 7 depicts a flowchart for steps performed in the initial iteration according to one example. The initial iteration can comprise splitting the source code 1 into multiple parts, for example a first part $10_1$, a second part $10_2$ and a third part $10_3$. In one example, the source code 1 shown in FIG. 2 can comprise more parts, functions, modules and/or units, which are not shown in FIG. 2, in addition to the first part 11, the second part 12, the input module, the data preprocessing function 113, the first function 111, the second function 122 and the loop 101. Furthermore, the source code 1 can be divided into the first part 11 and the second part 12 as depicted in FIG. 2 in one example. In another example, the source code 1 may be divided into the first part $10_1$, the second part $10_2$ and the third part $10_3$ as shown in FIG. 7.

Parts $10_1$, $10_2$, $10_3$ can comprise a respective batch, according to the example shown in FIG. 7, such as a first batch $20_1$, a second batch $20_2$ and a third batch $20_3$ of units of the source code 1. According to the example depicted in FIG. 7, the units of the first batch $20_1$ are compilable separately from each other. The same can hold for the units of the second batch $20_2$ and the third batch $20_3$.

Furthermore, the computer system 10 can be configured to generate respective executable files in the initial iteration, for example a first executable file $30_1$, a second executable file $30_2$ and a third executable file $30_3$, which are associated with one respective part of the multiple parts. For example, the first executable file $30_1$ can be associated to the first part $10_1$, the second executable file $30_2$ can be associated to the second part $10_2$, the third executable file $30_3$ can be associated to the third part $10_3$.

The computer system 10 can generate the respective executable file $30_1$, $30_2$, $30_3$ by compiling the source code 1. Furthermore, the computer system 10 can apply a new compiler optimization setting for compiling the respective part $10_1$, $10_2$, $10_3$ which is associated to the respective executable file $30_1$, $30_2$, $30_3$ compared to a compiler optimization setting which is applied for compiling the respective part $10_1$, $10_2$, $10_3$ for generating the reference executable file. In one example, the new compiler optimization setting for compiling the respective part $10_1$, $10_2$, $10_3$ can correspond to a lower optimization level compared to the compiler optimization setting, which is applied for compiling the respective part $10_1$, $10_2$, $10_3$ for generating the reference executable file.

For example, the processor 16 can compile the source code 1 using the "-O0"-flag or the "-Og"-flag for compiling the first part $10_1$ and the "-O1"-flag or the "-O2"-flag for compiling a first remaining part of the source code 1 to generate the first executable file 30₁. The first remaining part can comprise parts of the source code 1 except the first part 10₁.

Similarly, the processor 16 can compile the source code 1 using the "-O0"-flag or the "-Og"-flag for compiling the second part 10₂ and the "-O1"-flag or the "-O2"-flag for compiling a second remaining part of the source code 1 to generate the second executable file 30₂. The second remaining part can comprise parts of the source code 1 except the second part 10₂.

Analogously, the processor 16 can compile the source code 1 using the "-O0"-flag or the "-Og"-flag for compiling the third part 10₃ and the "-O1"-flag or the "-O2"-flag for compiling a third remaining part of the source code 1 to generate the third executable file 30₃. The third remaining part can comprise all parts of the source code 1 except the third part 10₃.

In most cases, the processor 16 can apply an unmodified compiler optimization setting for compiling the respective remaining parts, in this case the first, second and third remaining part, compared to a compiling process for generating the reference executable file.

Furthermore, the computer system 10 may be configured to determine a respective value of the target quantity for executables file 30₁, 30₂, 30₃. In one example, the processor 16 can run executable files 30₁, 30₂, 30₃ separately and measure a respective execution time 40₁, 40₂, 40₃ of the respective executable file 30₁, 30₂, 30₃.

Furthermore, the computer system 10 can be configured to determine a main performance part of the source code 1. The term "first main performance part" as used in the example described by FIG. 2 can be used to illustrate that the first main performance part is different to the main performance part according to the example given by FIG. 7. The main performance part can be the part of the multiple parts 10₁, 10₂, 10₃ of the source code 1 that can have the greatest influence on the target quantity with respect to the new compiler optimization settings of the multiple parts 10₁, 10₂, 10₃. For example, if the execution time of the third executable file 30₃ is the greatest of the respective execution times of the executable files 30₁, 30₂, 30₃, then the third part 10₃ has the greatest influence on the target quantity. Thus, the third part 10₃ can be the main performance part according to this example.

Figure 8:
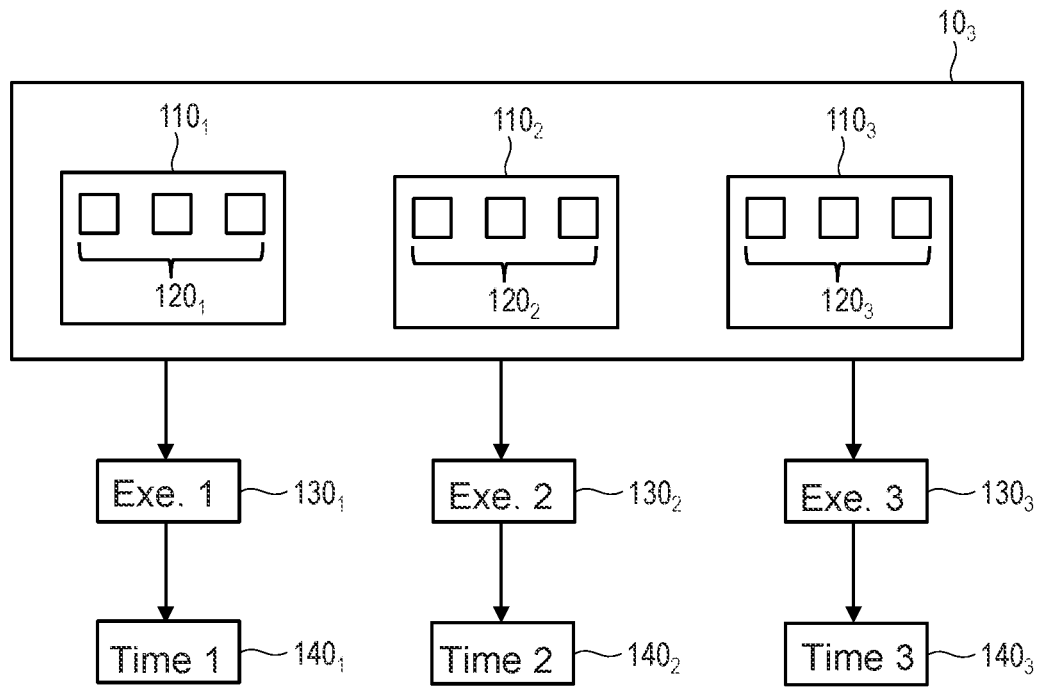
FIG. 8 depicts a block diagram schematically illustrating a second iteration of the several iterations for generating a compiled version of the source code shown in FIG. 2.

FIG. 8 depicts a flowchart of a second iteration which can be performed by the computer system 10.

The computer system 10 can be configured to split the main performance part, i.e., the third part 10₃ according to the example given above, into multiple parts, e.g., a first part 110₁, a second part 110₂ and a third part 110₃ of the main performance part.

Parts 110₁, 110₂, 110₃ of the main performance part can comprise a respective batch, such as a first batch 120₁, a second batch 120₂ and a third batch 120₃, of units of the source code 1. According to the example depicted in FIG. 8, the units of the first batch 120₁ are compilable separately from each other. The same can hold for the units of the second batch 120₂ and the third batch 120₃ of the main performance part.

Furthermore, the computer system 10 can be configured to generate further respective executable files in the second iteration, for example a first executable file 130₁, a second executable file 130₂ and a third executable file 130₃ of the second iteration which are each associated with a respective part of the multiple parts 110₁, 110₂, 110₃ of the main performance part. For example, the first executable file 130₁ of the second iteration can be associated to the first part 110₁ of the main performance part, the second executable file 130₂ of the second iteration can be associated with the second part 110₂ of the main performance part, the third executable file 130₃ of the second iteration can be associated with the third part 110₃ of the main performance part. The computer system 10 can generate the respective executable file 130₁, 130₂, 130₃ of the second iteration by compiling the source code 1.

Furthermore, the computer system 10 can apply a new compiler optimization setting for compiling the respective part 110₁, 110₂, 110₃ of the main performance part which can be associated with the respective executable file 130₁, 130₂, 130₃ of the second iteration compared to the compiler optimization setting which can be applied for compiling the respective part 110₁, 110₂, 110₃ of the main performance part for generating the reference executable file. In one example, the new compiler optimization setting for compiling the respective part 110₁, 110₂, 110₃ of the main performance part can correspond to a lower optimization level compared to the compiler optimization setting which can be applied for compiling the respective part 110₁, 110₂, 110₃ of the main performance part for generating the reference executable file.

For example, the processor 16 can compile the source code 1 using the "-O0"-flag or the "-Og"-flag for compiling the first part 110₁ of the main performance part and the "-O1"-flag or the "-O2"-flag for compiling a further first remaining part of the source code 1 to generate the first executable file 130₁ of the second iteration. The further first remaining part can comprise all parts of the source code 1 except the first part 110₁ of the main performance part.

Similarly, the processor 16 can compile the source code 1 using the "-O0"-flag or the "-Og"-flag for compiling the second part 110₂ of the main performance part and the "-O1"-flag or the "-O2"-flag for compiling a further second remaining part of the source code 1 to generate the second executable file 130₂ of the second iteration. The further second remaining part can comprise all parts of the source code 1 except the second part 110₂ of the main performance part.

Analogously, the processor 16 can compile the source code 1 using the "-O0"-flag or the "-Og"-flag for compiling the third part 110₃ of the main performance part and the "-O1"-flag or the "-O2"-flag for compiling a further third remaining part of the source code 1 to generate the third executable file 130₃ of the second iteration. The third remaining part can comprise all parts of the source code 1 except the third part 110₃ of the main performance part.

In most cases, the processor 16 can apply an unmodified compiler optimization setting for compiling the respective further remaining parts, in this case the further first, further second and further third remaining part, compared to a compiling process for generating the reference executable file.

Furthermore, the computer system 10 can be configured to determine a respective value of the target quantity for each executable file 130₁, 130₂, 130₃ of the second iteration. In one example, the processor 16 can run each executable file 130₁, 130₂, 130₃ of the second iteration separately and measure a respective execution time 140₁, 140₂, 140₃ of the respective executable file 130₁, 130₂, 130₃ of the second iteration.

Furthermore, the computer system 10 can be configured to determine a new main performance part. The new main performance part can be the part of the multiple parts 110₁, 110₂, 110₃ of the main performance part that has the greatest influence on the target quantity with respect to the new compiler optimization settings used for compiling the multiple parts $110_1$, $110_2$, $110_3$ of the main performance part. For example, if the execution time of the second executable file $130_2$ of the second iteration is the greatest of the respective execution times of the executable files $130_1$, $130_2$, $130_3$ of the second iteration, then the second part $110_2$ of the main performance part has the greatest influence on the target quantity. Accordingly, the second part $110_2$ of the main performance part can be the new main performance part in this example.

Figure 9:
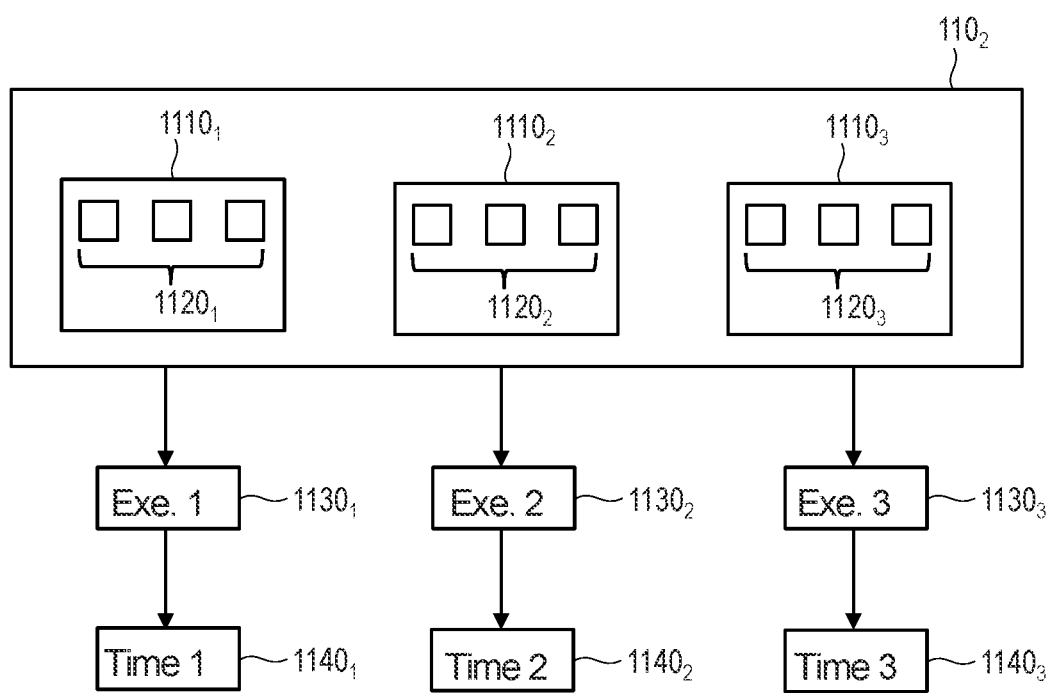
FIG. 9 depicts a block diagram schematically illustrating a third iteration of the several iterations for generating a compiled version of the source code shown in FIG. 2.

FIG. 9 depicts a flowchart of a third iteration which can be performed by means of the computer system 10. The third iteration can be the subsequent iteration of the second iteration.

In response to determining the new main performance part of the second iteration, the processor 16 can define the new main performance part of the second iteration as a main performance part of the source code 1 of the third iteration.

The computer system 10 can be configured to split the main performance part of the third iteration, i.e., the second part $110_2$ of the main performance part of the second iteration according to the example given above, into multiple parts, for example a first part 11101, a second part 11102 and a third part 11103 of the main performance part of the third iteration.

Each part 11101, 11102, 11103 of the main performance part of the third iteration can comprise a respective batch, such as a first batch 11201, a second batch 11202 and a third batch 11203, of units of the source code 1. According to the example depicted in FIG. 9, the units of the first batch 11201 are compilable separately from each other. The same can hold for the units of the second batch 11202 and the third batch 11203 of the main performance part of the third iteration.

Furthermore, the computer system 10 can be configured to generate second further respective executable files in the third iteration, for example a first executable file 11301, a second executable file 11302 and a third executable file 11303 of the third iteration which are associated with one respective part of the multiple parts 11101, 11102, 1110 of the main performance part of the third iteration. For example, the first executable file 11301 of the third iteration can be associated to the first part 11101 of the main performance part of the third iteration, the second executable file 11302 of the third iteration can be associated with the second part 11102 of the main performance part of the third iteration, the third executable file 11303 of the third iteration can be associated with the third part 11103 of the main performance part of the third iteration. The computer system 10 can generate the respective executable file 11301, 11302, 11303 of the third iteration by compiling the source code 1.

Furthermore, the computer system 10 can apply a new compiler optimization setting for compiling the respective part 11101, 11102, 11103 of the main performance part of the third iteration which is associated with the respective executable file 11301, 11302, 11303 of the third iteration compared to the compiler optimization setting which is applied for compiling the respective part 11101, 11102, 11103 of the main performance part of the third iteration for generating the reference executable file. In one example, the new compiler optimization setting for compiling the respective part 11101, 11102, 11103 of the main performance part of the third iteration can correspond to a lower optimization level compared to the compiler optimization setting which is applied for compiling the respective part 11101, 11102, 11103 of the main performance part of the third iteration for generating the reference executable file.

For example, the processor 16 can compile the source code 1 using the "-O0"-flag or the "-Og"-flag for compiling the first part 11101 of the main performance part of the third iteration and the "-O1"-flag or the "-O2"-flag for compiling a fourth remaining part of the source code 1 to generate the first executable file 11301 of the third iteration. The fourth remaining part can comprise all parts of the source code 1 except the first part 11101 of the main performance part of the third iteration.

Similarly, the processor 16 can compile the source code 1 using the "-O0"-flag or the "-Og"-flag for compiling the second part 11102 of the main performance part of the third iteration and the "-O1"-flag or the "-O2"-flag for compiling a fifth remaining part of the source code 1 to generate the second executable file 11302 of the third iteration. The fifth remaining part can comprise all parts of the source code 1 except the second part 11102 of the main performance part of the third iteration.

Analogously, the processor 16 can compile the source code 1 using the "-O0"-flag or the "-Og"-flag for compiling the third part 11103 of the main performance part of the third iteration and the "-O1"-flag or the "-O2"-flag for compiling a sixth remaining part of the source code 1 to generate the third executable file 11303 of the third iteration. The sixth remaining part can comprise all parts of the source code 1 except the third part 11103 of the main performance part of the third iteration.

In most cases, the processor 16 can apply an unmodified compiler optimization setting for compiling the fourth, fifth and sixth remaining part, compared to a compiling process for generating the reference executable file.

Furthermore, the computer system 10 can be configured to determine a respective value of the target quantity for each executable file 11301, 11302, 11303 of the third iteration. In one example, the processor 16 can run each executable file 11301, 11302, 11303 of the third iteration separately and measure a respective execution time 11401, 11402, 11403 of the respective executable file 11301, 11302, 11303 of the third iteration.

Furthermore, the computer system 10 can be configured to determine a new main performance part of the third iteration. The new main performance part of the third iteration can be the part of the multiple parts 11101, 11102, 11103 of the main performance part of the third iteration that has the greatest influence on the target quantity with respect to the new compiler optimization settings used for compiling the multiple parts 11101, 11102, 11103 of the main performance part of the third iteration. For example, if the execution time of the first executable file 11301 of the third iteration is the greatest of all the respective execution times of the executable files 11301, 11302, 11303 of the third iteration, then the first part 11101 of the main performance part of the third iteration has the greatest influence on the target quantity. Thus, the first part 11101 of the main performance part of the third iteration can be the new main performance part of the third iteration according to this example.

Figure 10:
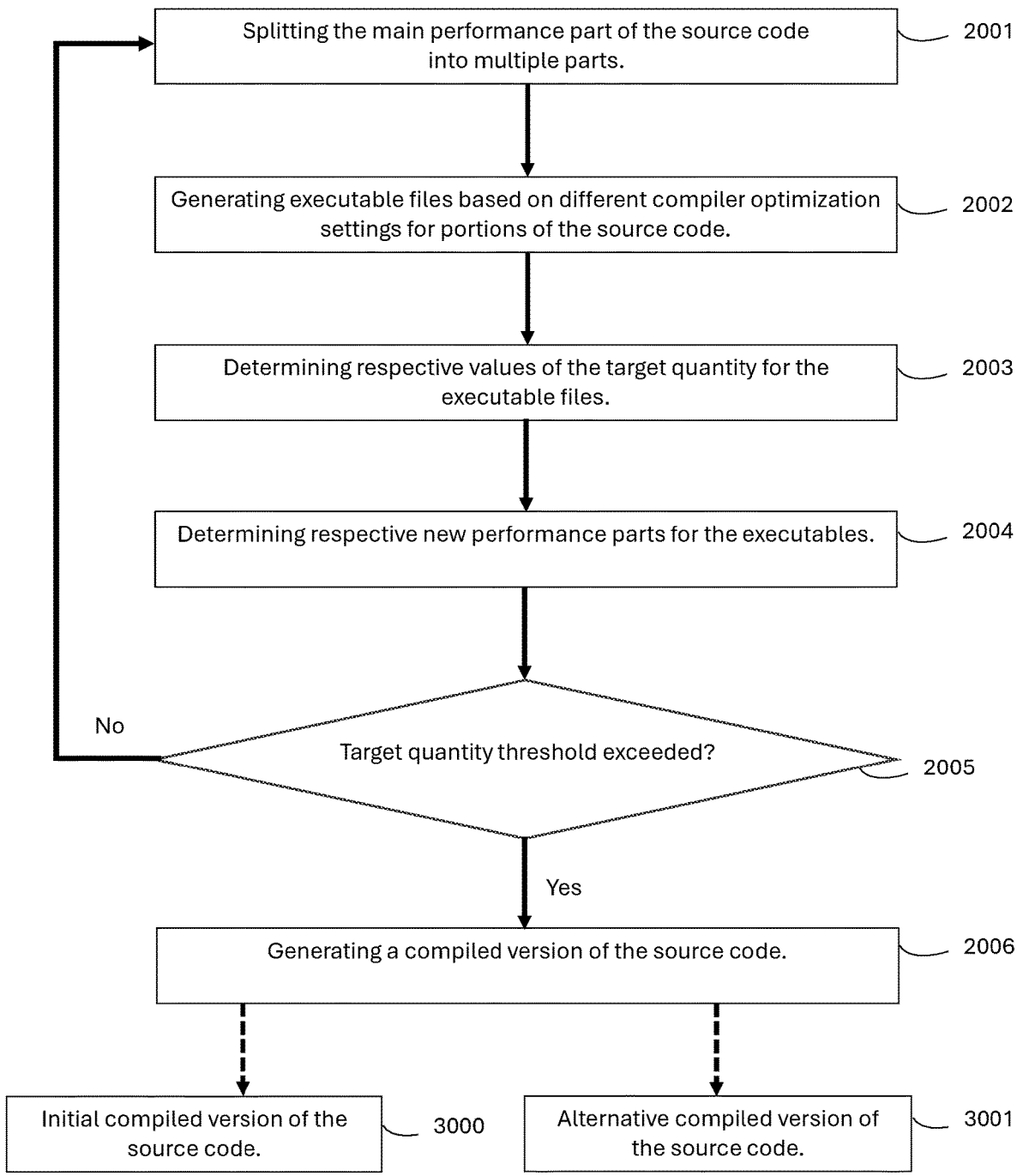
FIG. 10 depicts a block diagram schematically illustrating a method for generating the compiled version of the source code shown in FIG. 2.

The computer system 10 can be configured to check whether one of the values of the target quantity, which can be associated with one respective executable files of each iteration, has reached a performance threshold. The performance threshold can be a predetermined maximum execution time or a maximum code size. Thus, the processor 16 can test whether one of the values of the target quantity, which are respectively computed for the first executable file $30_1$, second executable file $30_2$ and the third executable file $30_3$ of the first iteration, is greater or equal than the maximal execution time. If this is the case, then the processor 16 cannot proceed to the second iteration. Instead, the processor 16 can generate a compiled version 3000 of the program source code 1 by compiling the source code 1, as depicted in FIG. 10. The compiling of the source code 1 can comprise applying a higher optimization level of the compiler 51 for compiling the main performance part than for compiling a seventh remaining part of the source code 1. The seventh remaining part can comprise the units of the source code 1 except the units which are comprised by the main performance part. The processor 16 can generate an object file of the main performance part and an object file of the seventh remaining part and link these object files to generate the compiled version 3000 of the program source code 1.

If all values of the target quantity which are respectively measured for the first executable file $30_1$, second executable file $30_2$ and the third executable file $30_3$ of the first iteration are less than the maximum execution time, then the processor 16 can proceed to perform the second iteration as described above.

Similarly, the processor 16 can test whether one of the values of the target quantity which are respectively computed for the first executable file $130_1$, second executable file $130_2$ and the third executable file $130_3$ of the second iteration is greater or equal than the maximal execution time. If this is the case, then the processor 16 cannot proceed to the third iteration. Instead, the processor 16 can generate a first further compiled version 3001 of the program source code 1, as shown in FIG. 10, by compiling the source code 1. The compiling of the source code 1 can comprise applying a higher optimization level of the compiler 51 for compiling the main performance part of the second iteration than for compiling an eighth remaining part of the source code 1. The eighth remaining part can comprise all units of the source code 1 except the units which are comprised by the main performance part of the second iteration.

If the values of the target quantity, which are respectively measured for the first executable file $130_1$, second executable file $130_2$ and the third executable file $130_3$ of the second iteration, are less than the maximum execution time, then the processor 16 can proceed to perform the third iteration as described above.

Accordingly, the processor 16 can proceed to repeat the second or third iteration until one of the values of the target quantity of the executable files of a last iteration of the iterations reaches the performance threshold. For example, if one of the values of the target quantity, which are respectively computed for the first executable file $130_1$, second executable file $130_2$ and the third executable file $130_3$ of the second iteration, is greater than or equal to the maximum execution time, then the second iteration can be the last iteration.

FIG. 10 depicts a flowchart of a method of performing repeated iterations for generating a compiled version of an executable file of the source code 1, such as the compiled version 3000 or the first further compiled version 3001. Each iteration can comprise the following steps.

In step 2001, the main performance part of the source code 1 can be split into multiple parts, for example into the multiple parts $10_1$, $10_2$, $10_3$ or into the multiple parts $110_1$, $110_2$, $110_3$. The splitting can be performed as described for the initial or second iteration.

In step 2002, respective executable files may be generated. The respective executable files can be associated with one respective part of the multiple parts. The generating of the respective executable file can comprise applying a new compiler optimization setting for compiling the respective part which is associated with the respective executable file and applying an unmodified compiler optimization setting for compiling the respective remaining parts of the main performance part. In one example, the respective executable files can comprise the first executable file $130_1$, second executable file $130_2$ and the third executable file $130_3$ of the second iteration.

In step 2003, a respective value of the target quantity for the executable files can be determined. In one example, these respective values of the target quantity can be the values $140_1$, $140_2$, $140_3$.

In step 2004, a respective new main performance part can be determined. The respective new main performance part can be the part of the multiple parts of the main performance part that has the greatest influence on the target quantity with respect to the new compiler optimization settings of the multiple parts. The respective new main performance part can be the main performance part of a subsequent iteration. In one example, the new main performance part can be the new main performance part of the second iteration.

In step 2005, a check can be made whether at least one of the values of the target quantity of the executable files of a last iteration of the iterations reaches a performance threshold. If this is the case, then step 2006 may be performed. If this is not the case, then the steps 2001, 2002, 2003, 2004 and 2005 may be repeated.

In step 2006, a compiled version of the program source code 1 can be generated by compiling the source code 1. The compiling of the source code 1 for generating the compiled version of the program source code 1 can comprise applying a higher optimization level of the compiler 51 for compiling the new main performance part of the last iteration than for compiling a remaining rest of the source code 1. In one example, in case the initial iteration is the last iteration, the compiled version of the program source code 1 can be the compiled version 3000. In another example, in case the second iteration is the last iteration, the compiled version of the program source code 1 can be the first further compiled version 3001.

Figure 11:
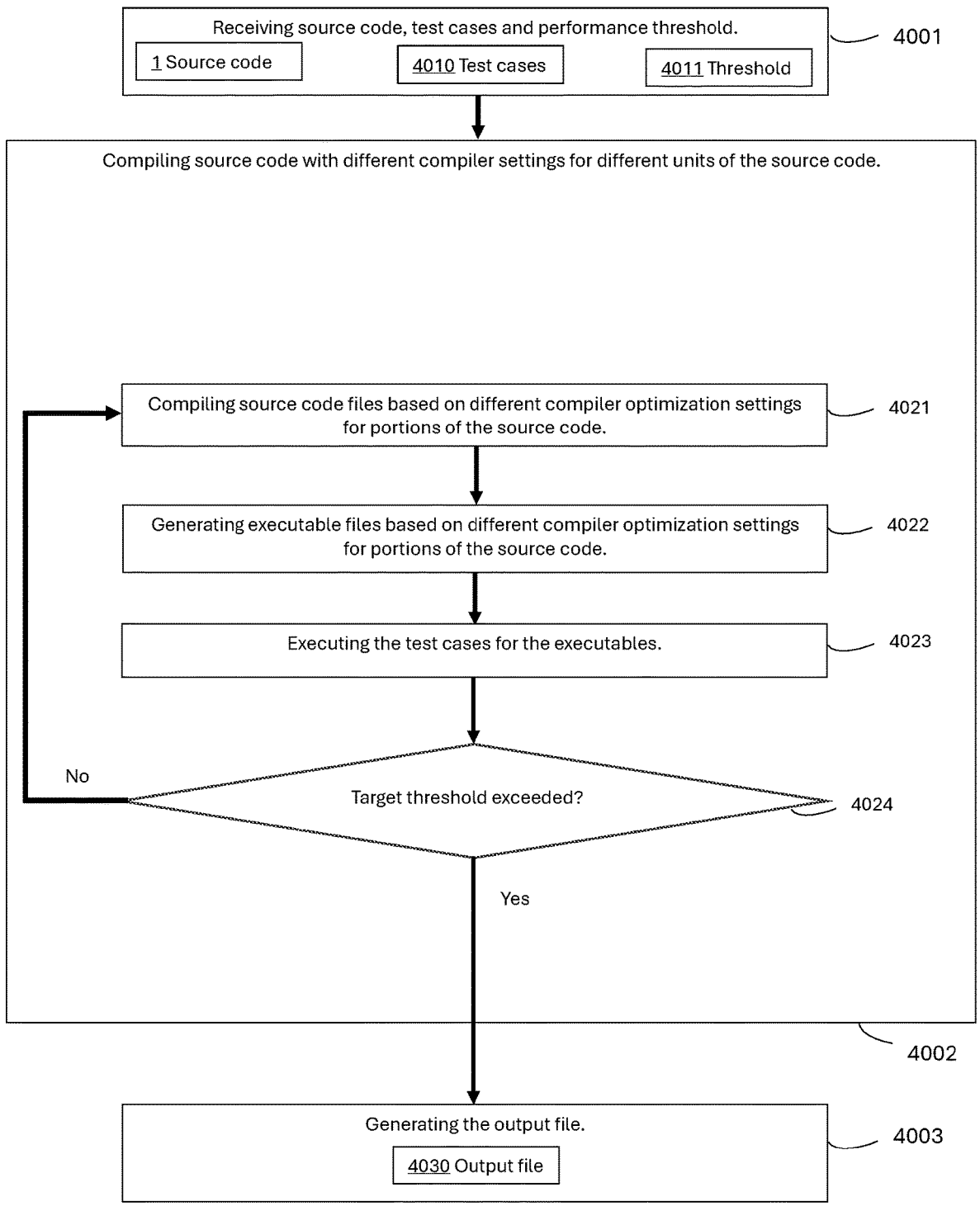
FIG. 11 depicts a block diagram schematically illustrating a variant of the method for generating the compiled version of the source code shown in FIG. 10.

FIG. 11 depicts a flowchart for describing a variant of the method comprising the steps 2001, 2002, 2003, 2004, 2005 and 2006 for generating a compiled version of an executable file of the source code 1, such as the compiled version 3000 or the first further compiled version 3001. The variant of the method can comprise the following steps.

In step 4001, the source code 1, test cases 4010, for testing the source code 1, and a performance threshold 4011 can be provided. By providing the performance threshold 4011 the target quantity can be defined. For example, if the performance threshold 4011 is the maximum execution time, then the target quantity can be the execution time. In another example, if the performance threshold 4011 is the maximum code size, then the target quantity can be the code size.

In step 4002, several different compiler settings for compiling the respective units of the source code 1 can be used for compiling the source code 1. This can be performed according to the steps 2001, 2002, 2003, 2004, 2005 and 2006, in one example. Step 4002 can comprise the following sub-steps.

In sub-step 4021, a new combination of compiler optimization flags can be set for compiling units of source code 1. The compiling units of source code 1 can be the batches of units of source code 1 described above, for example the first batch $120_1$, second batch $120_2$ and the third batch $120_3$ of units of the source code 1. The new combination of the compiler optimization flags can comprise at least one new compiler optimization flag for at least one compiling unit of the source code 1.

In sub-step 4022, the source code 1 can be compiled dependent on the new combination of compiler optimization flags by means of the compiler 51 resulting in a compiled version of the source code 1, for example the compiled version 3000 or the first further compiled version 3001.

In sub-step 4023, the compiled version of the source code 1 can be executed using the test cases 4010. The test cases 4010 can provide input data which can be processed by means of the input module described above. Furthermore, in sub-step 4023, for test cases, a respective value of the target quantity can be measured, for example a respective execution time of the compiled version of the source code 1. In one example, an average value of the respective values of the target quantity for each test case can be computed.

In sub-step 4024, checking whether the compiled version of the source code 1 satisfies one or more test criteria. An exemplary test criterion can refer to a "debuggability" of the source code 1 using the compiled version of the source code 1 in real applications and/or if the average value of the target quantity is below the performance threshold 4011. The sub-step 4024 can be performed by a developer, in case one of the test criteria is the "debuggability." If the compiled version of the source code 1 does not meet the one or more test criteria, then the sub-steps 4021, 4022, 4023 and 4024 can be repeated. If the compiled version of the source code 1 does meet the one or more test criteria, then an output file 4030 can be provided in step 4003.

The output file 4030 can comprise the compiled version of the source code 1, in one example. Alternatively, or in addition, the output file 4030 can comprise an information about the compiler optimization setting for compiling the main performance part of the last iteration when performing the steps 2001, 2002, 2003, 2004, 2005 and 2006. In this case, the output file 4030 can also comprise information about the compiler optimization setting for compiling the remaining units of the source code 1, which do not comprise the main performance part of the last iteration when performing the steps 2001, 2002, 2003, 2004, 2005 and 2006, according to one example.

Figure 12:
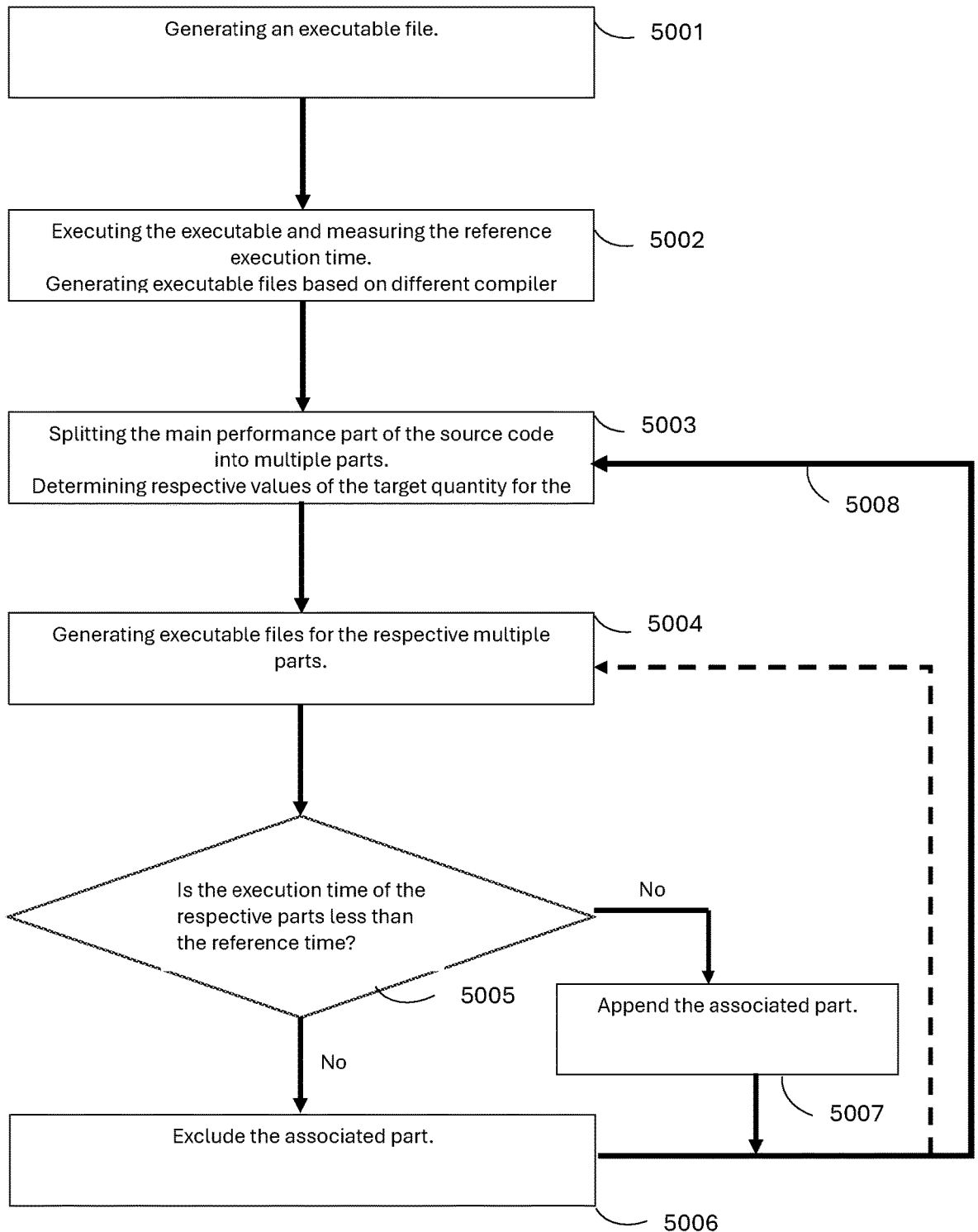
FIG. 12 depicts a block diagram schematically illustrating a further variant of the method for generating the compiled version of the source code shown in FIG. 10.

FIG. 12 depicts a flowchart of a method performing repeated iterations for generating a compiled version of an executable file of the source code 1, such as the compiled version 3000 or the first further compiled version 3001. The method according to FIG. 12 can comprise the following steps.

In step 5001, the reference executable file can be generated as described above.

In step 5002, the reference executable file can be executed, for example using the test cases 4010, to measure the reference execution time.

In step 5003, the source code 1 can be split into a given number of parts. For example, the given number can be equal to three and the source code 1 can be split into the first part $10_1$, the second part $10_2$ and the third part $10_3$, as depicted in FIG. 7.

Each part $10_1$, $10_2$, $10_3$ can comprise a respective batch, according to the example shown in FIG. 7, such as a first batch $20_1$, a second batch $20_2$ and a third batch $20_3$, of units of the source code 1. According to the example depicted in FIG. 7, the units of the first batch $20_1$ can be compilable separately from each other. The same can hold for the units of the second batch $20_2$ and the third batch $20_3$.

In step 5004, respective executable files, for example the first executable file $30_1$, the second executable file $30_2$ and/or the third executable file $30_3$, can be generated. The first executable file $30_1$ can be associated with the first part $10_1$, the second executable file $30_2$ can be associated to the second part $10_2$, and the third executable file $30_3$ can be associated to the third part $10_3$. The respective executable files $30_1$, $30_2$, $30_3$ can be generated by compiling the source code 1.

The computer system 10 can apply the new compiler optimization setting for compiling the respective part $10_1$, $10_2$, $10_3$ which is associated with the respective executable file $30_1$, $30_2$, $30_3$ compared to the compiler optimization setting which is applied for compiling the respective part $10_1$, $10_2$, $10_3$ for generating the reference executable file. In one example, the new compiler optimization setting for compiling the respective part $10_1$, $10_2$, $10_3$ can correspond to a lower optimization level compared to the compiler optimization setting which is applied for compiling the respective part $10_1$, $10_2$, $10_3$ for generating the reference executable file.

For example, the processor 16 can compile the source code 1 using the "-00"-flag or the "-0g"-flag for compiling the first part $10_1$ and the "-01"-flag or the "-02"-flag for compiling a first remaining part of the source code 1 to generate the first executable file $30_1$. The first remaining part can comprise all parts of the source code 1 except the first part $10_1$.

Similarly, the processor 16 can compile the source code 1 using the "-00"-flag or the "-0g"-flag for compiling the second part $10_2$ and the "-01"-flag or the "-02"-flag for compiling a second remaining part of the source code 1 to generate the second executable file $30_2$. The second remaining part can comprise parts of the source code 1 except the second part $10_2$.

Analogously, the processor 16 can compile the source code 1 using the "-00"-flag or the "-0g"-flag for compiling the third part $10_3$ and the "-01"-flag or the "-02"-flag for compiling a third remaining part of the source code 1 to generate the third executable file $30_3$. The third remaining part can comprise parts of the source code 1 except the third part $10_3$.

In most cases, the processor 16 can apply an unmodified compiler optimization setting for compiling the respective remaining parts, in this case the first, second and third remaining part, compared to a compiling process for generating the reference executable file.

Furthermore, in step 5004, the respective value of the target quantity for each executable file $30_1$, $30_2$, $30_3$ can be determined. In one example, the processor 16 can run each executable file $30_1$, $30_2$, $30_3$ separately and measure a respective execution time $40_1$, $40_2$, $40_3$ corresponding to the respective executable file $30_1$, $30_2$, $30_3$.

In step 5005, the respective execution time $40_1$, $40_2$, $40_3$ can be compared to the reference execution time. If a respective difference between the respective execution time $40_1$, $40_2$, $40_3$ and the reference execution time is below a threshold, then that part which is associated to the executable file corresponding to the respective execution time $40_1$, $40_2$, $40_3$ can be excluded from a group of parts which can be compiled using at least one compiler optimization option. The group of parts which can be compiled using at least one compiler optimization option can be the main performance part of the initial iteration according to example shown in FIG. 7. Hence, the variant shown in FIG. 12 can present a further example how to determine the main performance part.

In one example, the respective executable files $30_1$, $30_2$, $30_3$, and their corresponding execution times $40_1$, $40_2$, $40_3$ can be determined in separate loops. One of the separate loops is indicated with the dashed arrow in FIG. 12. In this example, each part $10_1$, $10_2$, $10_3$ can be excluded from the main performance part separately in one of the loops if the respective difference between the respective execution time $40_1$, $40_2$, $40_3$ and the reference execution time is below the threshold. An exclusion of one of the parts $10_1$, $10_2$, $10_3$ can be performed in the form of step 5006.

In step 5007, the respective part $10_1$, $10_2$, $10_3$ can be appended to the main performance part, if the respective difference between the respective execution time $40_1$, $40_2$, $40_3$ and the reference execution time is equal to or above the threshold. Thus, repeating the step 5007 based on repeating the loop indicated by the dashed arrow can present a further variant of how the main performance part may be determined.

An arrow 5008 in FIG. 12 can indicate a further loop. The further loop comprises the steps 5003, 5004, 5005, 5006, 5007. In a repetition of step 5003, the main performance part can be split into multiple parts instead of splitting the source code 1 into the multiple parts. For example, the main performance part can be split into the parts $110_1$, $110_2$, $110_3$ as depicted in FIG. 8.

Figure 13:
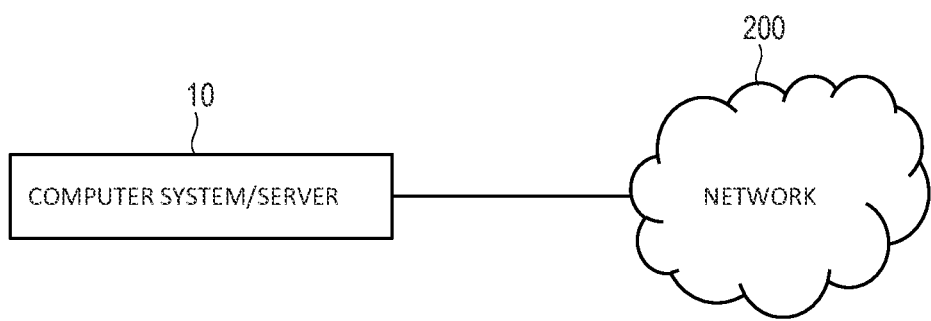
FIG. 13 depicts a network connected to the computer system of FIG. 1.

FIG. 13 shows an exemplary computing environment where a computer system such as the computer system 10 is connected, e.g., using the network adapter 20, to a network 200. Without limitation, the network 200 may be a communications network such as the internet, a local-area network (LAN), a wireless network such as a mobile communications network, and the like. The network 200 may comprise a computing network such as a cloud-computing network. The computer system 10 may receive data to be processed from the network 200 and/or may provide a computing result to another computing device connected to the computer system 10 via the network 200.

Various embodiments are specified in the following numbered clauses:

1. A computer-implemented method for generating a compiled version of a program source code by means of a compiler, the method comprising: splitting the source code into at least a first part and a second part; generating at least two different executable files of the source code, the generating of the at least two different executable files comprising applying at least two different compiler optimization settings for compiling the first part and applying at least two different compiler optimization settings for compiling the second part; determining a respective value of a target quantity for each executable file of the at least two different executable files; determining a main performance part of the source code dependent on the values of the target quantity of the at least two different executable files, wherein the main performance part is the part of the at least first part and the second part that has a greater influence on the target quantity with respect to the different compiler optimization settings; and generating the compiled version of the program source code by compiling the source code, the compiling of the source code comprising applying a higher optimization level of the compiler for compiling the main performance part than for compiling the remaining part of the source code.

2. The method of clause 1, the method further comprising performing the splitting of the source code, the generating of the at least two different executable files, the determining of the respective value of the target quantity and the determining of the main performance part automatically.

3. The method of clause 1 or 2, wherein the first part is designed in the form of a first batch of several units of the source code and the second part is designed in the form a second batch of several units of the source code, wherein the units of the first batch are compilable separately from each other and the units of the second batch are compilable separately from each other.

4. The method of any of the previous clauses, the compiling of the source code comprising applying at least one optimization option of the compiler for compiling the main performance part and disabling all optimization options of the compiler for compiling the remaining part of the source code.

5. The method of any of the previous clauses, the method further comprising: generating a reference executable file, the generating of the reference executable file comprising applying at least one optimization option of the compiler for compiling each part of the source code; determining a value of the target quantity for the reference executable file; wherein the generating of the at least two respective different executable files comprises generating a first executable file, the generating of the first executable file comprising disabling all optimization options of the compiler for compiling the first part and applying at least one optimization option of the compiler for compiling the second part, and generating a second executable file, the generating of the second executable file comprising disabling all optimization options of the compiler for compiling the second part and applying at least one optimization option of the compiler for compiling the first part; wherein the determining of the respective value of the target quantity for each executable file of the at least two different executable files comprises determining a respective value of the target quantity for the first and the second executable file; and wherein the determining of the main performance part comprises comparing the respective value of the target quantity of the first and the second executable file with the value of the target quantity of the reference executable file.

6. The method of any of the previous clauses, the method further comprising performing repeatedly iterations, each iteration comprising: splitting the main performance part of the source code resulting in at least a first part and a second part of the main performance part; generating at least two respective different executable files, the generating of the at least two respective different executable files comprising applying at least one new compiler optimization setting for compiling the first part of the main performance part and applying at least one new compiler optimization setting for compiling the second part of the main performance part; determining a respective value of the target quantity for each executable file of the at least two respective different executable files; determining a respective new main performance part, wherein the respective new main performance part is the part of the at least first part and the second part of the main performance part that has a greater influence on the target quantity with respect to the new compiler optimization settings, wherein the respective new main performance part is the main performance part of a subsequent iteration; and wherein the compiling of the source code for generating the compiled version of the program source code comprises applying a higher optimization level of the compiler for compiling the new main performance part of a last iteration of the iterations than for compiling a remaining rest of the source code.

7. The method of clause 6, wherein the iterations are performed until one of the values of the target quantity of the at least two respective different executable files reach a performance threshold.

8. The method of clause 6, wherein the iterations are performed until a number of compilable units of the new main performance part reaches a given minimal number.

9. The method of any of the previous clauses 6, 7 or 8, wherein the generating of the at least two respective different executable files in each iteration comprises generating a respective first executable file, the generating of the respective first executable file comprising disabling all optimization options of the compiler for compiling the first part of the main performance part and applying at least one optimization option of the compiler for compiling the second part of the main performance part, and generating a respective second executable file, the generating of the respective second executable file comprising disabling all optimization options of the compiler for compiling the second part of the main performance part and applying at least one optimization option of the compiler for compiling the first part of the main performance part.

10. The method of any of the previous clauses 6, 7 or 8, wherein the generating of the at least two respective different executable files in each iteration comprises generating a respective first executable file, the generating of the first executable file comprising disabling all optimization options of the compiler for compiling the first part of the main performance part and applying all optimization options of the compiler for compiling the second part of the main performance part, and generating a respective second executable file, the generating of the second executable file comprising disabling all optimization options of the compiler for compiling the second part of the main performance part and applying all optimization options of the compiler for compiling the first part of the main performance part.

11. The method of any of the previous clauses 6-10, the method further comprising: generating a reference executable file, the generating of the reference executable file comprising applying at least one optimization option of the compiler for compiling each part of the source code; determining a value of the target quantity for the reference executable file; wherein the determining of the respective new main performance part in each iteration comprises comparing the respective value of the target quantity of the at least two respective different executable files with the value of the target quantity of the reference executable file.

12. The method of any of the previous clauses 1-5, the method further comprising performing repeatedly iterations, each iteration comprising: splitting the main performance part of the source code into multiple parts; generating respective executable files which are each associated to one respective part of the multiple parts, the generating of the respective executable file comprising applying a new compiler optimization setting for compiling the respective part which is associated to the respective executable file and applying an unmodified compiler optimization setting for compiling the respective remaining parts of the main performance part; determining a respective value of the target quantity for each executable file; determining a respective new main performance part, wherein the respective new main performance part is the part of the multiple parts of the main performance part that has the greatest influence on the target quantity with respect to the new compiler optimization settings of the multiple parts, wherein the respective new main performance part is the main performance part of a subsequent iteration; and wherein the compiling of the source code for generating the compiled version of the program source code comprises applying a higher optimization level of the compiler for compiling the new main performance part of a last iteration of the iterations than for compiling a remaining rest of the source code.

13. The method of any of the previous clauses 1-5, the determining of the main performance part comprising solving an optimization problem by means of a target function, wherein a value of the target function is dependent on a number of parts of the source code which are compiled such that all optimization options of the compiler are disabled, the solving of the optimization problem comprising maximizing the number of these parts of the source code such that a value of the target quantity for the compiled version of the program source code is less than a further performance threshold.

14. The method of clause 13, wherein the target function is equal to the number of the parts of the source code which are compiled such that all optimization options of the compiler are disabled.

15. The method of any of the previous clauses 1-5, wherein: the splitting of the source code comprises splitting the source code into several parts, wherein the several parts comprise the first part and the second part; the generating of the at least two different executable files comprises generating a respective executable file corresponding to a respective part of the several parts of the source code, wherein the generating of the respective executable file comprises applying a reference compiler optimization setting for compiling each of the several parts except for the respective part and applying a respective further compiler optimization setting for compiling the respective part, wherein the respective further compiler optimization setting represents a compiler optimization setting for applying a lower optimization level compared to the reference compiler optimization setting; the determining of the respective value of the target quantity comprises determining a value of the target quantity for the respective executable file; the method further comprising sorting the values of the target quantity of the executable files; and the determining of the main performance part comprises determining the main performance part such that the main performance part comprises the part of the several parts having the smallest value of the target quantity.

16. The method of any of the previous clauses, wherein the respective value of the target quantity of each executable file is an execution time of the respective executable file.

17. The method of any of the previous clauses, wherein the respective value of the target quantity of each executable file is a size of the respective executable file.

18. The method of any of the previous clauses, wherein the source code comprises respective units, the splitting of the source code comprising discarding a part of the several units dependent on profiling data, wherein the profiling data indicates a respective work load of each unit produced during a preceding execution of a further compiled version of the source code and the discarding comprises discarding the units which produced together the least work load during the preceding execution of the further compiled version of the source, the method further comprising appending the discarded units to the remaining part of the source code.

19. The method of any of the previous clauses, wherein the source code comprises respective units, the splitting of the source code comprising discarding a part of the several units dependent on debugging data, wherein the debugging data indicates a respective debugging activity for each unit for analyzing a preceding execution of a further compiled version of the source code and the discarding comprises discarding the units corresponding together to the highest debugging activity, the method further comprising appending the discarded units to the remaining part of the source code.

20. A computer program product for generating a compiled version of a program source code by means of a compiler, the computer program product comprising one or more computer-readable storage media, and program instructions collectively stored on the one or more computer-readable storage media, the program instructions comprising: instructions for splitting the source code into at least a first part and a second part; instructions for generating at least two different executable files of the source code, the generating of the at least two different executable files comprising applying at least two different compiler optimization settings for compiling the first part and applying at least two different compiler optimization settings for compiling the second part; instructions for determining a respective value of a target quantity for each executable file of the at least two different executable files; instructions for determining a main performance part of the source code dependent on the values of the target quantity of the at least two different executable files, wherein the main performance part is the part of the at least first part and the second part that has a greater influence on the target quantity with respect to the different compiler optimization settings; and instructions for generating the compiled version of the program source code by compiling the source code, the compiling of the source code comprising applying a higher optimization level of the compiler for compiling the main performance part than for compiling the remaining part of the source code.

21. A computer system for generating a compiled version of a program source code by means of a compiler, the computer system being configured for: splitting the source code into at least a first part and a second part; generating at least two different executable files of the source code, the generating of the at least two different executable files comprising applying at least two different compiler optimization settings for compiling the first part and applying at least two different compiler optimization settings for compiling the second part; determining a respective value of a target quantity for each executable file of the at least two different executable files; determining a main performance part of the source code dependent on the values of the target quantity of the at least two different executable files, wherein the main performance part is the part of the at least first part and the second part that has a greater influence on the target quantity with respect to the different compiler optimization settings; and generating the compiled version of the program source code by compiling the source code, the compiling of the source code comprising applying a higher optimization level of the compiler for compiling the main performance part than for compiling the remaining part of the source code.

22. The computer system of claim 21, the computer system being further configured for performing repeatedly iterations, each iteration comprising: splitting the main performance part of the source code resulting in at least a first part and a second part of the main performance part; generating at least two respective different executable files, the generating of the at least two respective different executable files comprising applying at least one new compiler optimization setting for compiling the first part of the main performance part and applying at least one new compiler optimization setting for compiling the second part of the main performance part; determining a respective value of the target quantity for each executable file of the at least two respective different executable files; determining a respective new main performance part, wherein the respective new main performance part is the part of the at least first part and the second part of the main performance part that has a greater influence on the target quantity with respect to the new compiler optimization settings, wherein the respective new main performance part is the main performance part of a subsequent iteration; and wherein the compiling of the source code for generating the compiled version of the program source code comprises applying a higher optimization level of the compiler for compiling the new main performance part of a last iteration of the iterations than for compiling a remaining rest of the source code.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a compiled version of a program source code by a compiler, the computer-implemented method comprising:

splitting a source code into at least a first part and a second part;

generating at least two different executable files of the source code, the generating of the at least two different executable files comprising applying at least two different compiler optimization settings for compiling the first part and applying at least two different compiler optimization settings for compiling the second part;

determining a respective value of a target quantity for each executable file of the at least two different executable files;

generating a reference executable file, the generating of the reference executable file comprising applying at least one optimization option of the compiler for compiling each part of the source code:

determining a value of the target quantity for the reference executable file;

wherein the generating of the at least two respective different executable files comprises generating a first executable file, the generating of the first executable file comprising disabling all optimization options of the compiler for compiling the first part and applying at least one optimization option of the compiler for compiling the second part, and generating a second executable file, the generating of the second executable file comprising disabling all optimization options of the compiler for compiling the second part and applying at least one optimization option of the compiler for compiling the first part;

wherein the determining of the respective value of the target quantity for each executable file of the at least two different executable files comprise determining a respective value of the target quantity for the first and the second executable file;

wherein the determining of a main performance part comprises comparing the respective value of the target quantity of the first and the second executable file with the value of the target quantity of the reference executable file;

determining the main performance part of the source code dependent on the values of the target quantity of the at least two different executable files, wherein the main performance part is the part of the at least first part and the second part that has a greater influence on the target quantity with respect to the different compiler optimization settings; and compiling the source code to generate the compiled version of the source code, the compiling of the source code comprising applying a higher optimization level of the compiler for compiling the main performance part than for compiling the remaining part of the source code.

2. The computer-implemented method of claim 1, further comprising performing the splitting of the source code, the generating at least two different executable files, the determining of the respective value of the target quantity and the determining of the main performance part automatically.

3. The computer-implemented method of claim 1, wherein the first part is designed in a form of a first batch of portions of the source code and the second part is designed in the form a second batch of portions of the source code, wherein the portions of the first batch are compilable separately from each other and the portions of the second batch are compilable separately from each other.

4. The computer-implemented method of claim 1, wherein the compiling of the source code comprising applying at least one optimization option of the compiler for compiling the main performance part and disabling all optimization options of the compiler for compiling the remaining part of the source code.

5. The computer-implemented method of claim 1, further comprising performing repeated iterations comprising:
   splitting the main performance part of the source code resulting in at least a first part and a second part of the main performance part;
   generating at least two respective different executable files, the generating of the at least two respective different executable files comprising applying at least one new compiler optimization setting for compiling the first part of the main performance part and applying at least one new compiler optimization setting for compiling the second part of the main performance part;
   determining a respective value of the target quantity for each executable file of the at least two respective different executable files;
   determining a respective new main performance part, wherein the respective new main performance part is the part of the at least first part and the second part of the main performance part that has a greater influence on the target quantity with respect to the new compiler optimization settings, wherein the respective new main performance part is the main performance part of a subsequent iteration; and
   wherein the compiling of the source code for generating the compiled version of the program source code comprises applying a higher optimization level of the compiler for compiling the new main performance part of a last iteration of the iterations than for compiling a remaining rest of the source code.

6. The computer-implemented method of claim 5, wherein the iterations are performed until one of the values of the target quantity of the at least two respective different executable files reach a performance threshold.

7. The computer-implemented method of claim 5, wherein the iterations are performed until a predetermined number of compilable units source code of the new main performance part reaches a predetermined minimum threshold.

8. The computer-implemented method of claim 5, wherein the generating of the at least two respective different executable files in each iteration comprises generating a respective first executable file, the generating of the respective first executable file comprising disabling all optimization options of the compiler for compiling the first part of the main performance part and applying at least one optimization option of the compiler for compiling the second part of the main performance part, and generating a respective second executable file, the generating of the respective second executable file comprising disabling all optimization options of the compiler for compiling the second part of the main performance part and applying at least one optimization option of the compiler for compiling the first part of the main performance part.

9. The computer-implemented method of claim 5, wherein the generating of the at least two respective different executable files in each iteration comprises generating a respective first executable file, the generating of the first executable file comprising disabling all optimization options of the compiler for compiling the first part of the main performance part and applying all optimization options of the compiler for compiling the second part of the main performance part, and generating a respective second executable file, the generating of the second executable file comprising disabling all optimization options of the compiler for compiling the second part of the main performance part and applying all optimization options of the compiler for compiling the first part of the main performance part.

10. The computer-implemented method of claim 5, further comprising:
   generating a reference executable file, the generating of the reference executable file comprising applying at least one optimization option of the compiler for compiling each part of the source code;
   determining a value of the target quantity for the reference executable file; and
   wherein the determining of the respective new main performance part in each iteration comprises comparing the respective value of the target quantity of the at least two respective different executable files with the value of the target quantity of the reference executable file.

11. The computer-implemented method of claim 1, further comprising performing repeated iterations comprising:
   splitting the main performance part of the source code into multiple parts;
   generating respective executable files which are each associated to one respective part of the multiple parts, the generating of the respective executable file comprising applying a new compiler optimization setting for compiling the respective part which is associated to the respective executable file and applying an unmodified compiler optimization setting for compiling the respective remaining parts of the main performance part;
   determining a respective value of the target quantity for each executable file;
   determining a respective new main performance part, wherein the respective new main performance part is the part of the multiple parts of the main performance part that has the greatest influence on the target quantity with respect to the new compiler optimization settings of the multiple parts, wherein the respective new main performance part is the main performance part of a subsequent iteration; and
   wherein the compiling of the source code for generating the compiled version of the program source code comprises applying a higher optimization level of the compiler for compiling the new main performance part of a last iteration of the iterations than for compiling a remaining rest of the source code.

12. The computer-implemented method of claim 1, wherein the determining a main performance part further comprises solving an optimization problem by means of a target function, wherein a value of the target function is dependent on a number of parts of the source code which are compiled such that all optimization options of the compiler are disabled, the solving of the optimization problem comprising maximizing the number of these parts of the source code such that a value of the target quantity for the compiled version of the program source code is less than a further performance threshold.

13. The computer-implemented method of claim 12, wherein the target function is equal to the number of the parts of the source code which are compiled such that all optimization options of the compiler are disabled.

14. The computer-implemented method of claim 1, further comprising:
sorting the values of the target quantity of the executable files;
wherein the splitting of the source code comprises splitting the source code into several parts, wherein the several parts comprise the first part and the second part;
wherein the generating of the at least two different executable files comprises generating a respective executable file corresponding to a respective part of the several parts of the source code, wherein the generating of the respective executable file comprises applying a reference compiler optimization setting for compiling each of the several parts except for the respective part and applying a respective further compiler optimization setting for compiling the respective part, wherein the respective further compiler optimization setting represents a compiler optimization setting for applying a lower optimization level compared to the reference compiler optimization setting;
wherein the determining of the respective value of the target quantity comprises determining a value of the target quantity for the respective executable file; and
wherein the determining of the main performance part comprises determining the main performance part such that the main performance part comprises the part of the several parts having the smallest value of the target quantity.

15. The computer-implemented method of claim 1, wherein the respective value of the target quantity of each executable file is an execution time of the respective executable file or a size of the respective executable file.

16. The computer-implemented method of claim 5, wherein the respective value of the target quantity of each executable file is an execution time of the respective executable file.

17. The computer-implemented method of claim 5, wherein the respective value of the target quantity of each executable file is a size of the respective executable file.

18. The computer-implemented method of claim 1, further comprising:
appending the discarded source code to the remaining part of the source code; and
wherein the source code comprises respective source code portions, the splitting of the source code comprising discarding a part of the several source code portions dependent on profiling data, and wherein the profiling data indicates a respective work load of each source code portion produced during a preceding execution of a further compiled version of the source code and the discarding comprises discarding the units source code portions which produced together the least work load during the preceding execution of the further compiled version of the source code.

19. The computer-implemented method of claim 5, further comprising:
appending the discarded source code to the remaining part of the source code; and
wherein the source code comprises respective source code portions, the splitting of the source code comprising discarding a part of the several units source code portions dependent on profiling data, and wherein the profiling data indicates a respective work load of each source code portion produced during a preceding execution of a further compiled version of the source code and the discarding comprises discarding the source code portions which produced together the least work load during the preceding execution of the further compiled version of the source code.

20. The computer-implemented method of claim 1, further comprising:
appending the discarded source code portions to the remaining part of the source code; and
wherein the source code comprises respective source code portions, the splitting of the source code comprising discarding a part of the several source code portions dependent on debugging data, and wherein the debugging data indicates a respective debugging activity for each source code portion for analyzing a preceding execution of a further compiled version of the source code and the discarding comprises discarding the source code portions corresponding together to the highest debugging activity.

21. The computer-implemented method of claim 5, further comprising:
appending the discarded source code portions to the remaining part of the source code; and
wherein the source code comprises respective source code portions, the splitting of the source code comprising discarding a part of the several source code portions dependent on debugging data, and wherein the debugging data indicates a respective debugging activity for each source code portion for analyzing a preceding execution of a further compiled version of the source code and the discarding comprises discarding the source code portions corresponding together to the highest debugging activity.

22. A computer program product for generating a compiled version of a program source code by a compiler, the computer program product comprising one or more computer-readable storage media, and program instructions collectively stored on the one or more computer-readable storage media, the program instructions comprising:
instructions for splitting the source code into at least a first part and a second part; instructions for generating at least two different executable files of the source code, the generating of the at least two different executable files comprising applying at least two different compiler optimization settings for compiling the first part and applying at least two different compiler optimization settings for compiling the second part;
instructions for determining a respective value of a target quantity for each executable file of the at least two different executable files;
instructions for generating a reference executable file, the generating of the reference executable file comprising applying at least one optimization option of the compiler for compiling each part of the source code;
instructions for determining a value of the target quantity for the reference executable file;
wherein the generating of the at least two respective different executable files comprises generating a first executable file, the generating of the first executable file comprising disabling all optimization options of the compiler for compiling the first part and applying at least one optimization option of the compiler for compiling the second part, and generating a second executable file, the generating of the second executable file comprising disabling all optimization options of the compiler for compiling the second part and applying at least one optimization option of the compiler for compiling the first part;

wherein the determining of the respective value of the target quantity for each executable file of the at least two different executable files comprise determining a respective value of the target quantity for the first and the second executable file;

wherein the determining of a main performance part comprises comparing the respective value of the target quantity of the first and the second executable file with the value of the target quantity of the reference executable file;

instructions for determining the main performance part of the source code dependent on the values of the target quantity of the at least two different executable files, wherein the main performance part is the part of the at least first part and the second part that has a greater influence on the target quantity with respect to the different compiler optimization settings; and instructions for compiling the source code to generate the compiled version of the program source code, the compiling of the source code comprising applying a higher optimization level of the compiler for compiling the main performance part than for compiling the remaining part of the source code.

23. A computer system for generating a compiled version of a program source code by a compiler, the computer system comprising:

one or more computer processors;

one or more non-transitory computer readable storage media; and program instructions stored on the one or more non-transitory computer readable storage media, the program instructions comprising:

program instructions to split the source code into at least a first part and a second part;

program instructions to generate at least two different executable files of the source code based on applying at least two different compiler optimization settings for compiling the first part and applying at least two different compiler optimization settings for compiling the second part;

program instructions to determine a respective value of a target quantity for each executable file of the at least two different executable files;

program instructions to generate a reference executable file, the generating of the reference executable file comprising applying at least one optimization option of the compiler for compiling each part of the source code;

program instructions to determine a value of the target quantity for the reference executable file;

wherein the generating of the at least two respective different executable files comprises generating a first executable file, the generating of the first executable file comprising disabling all optimization options of the compiler for compiling the first part and applying at least one optimization option of the compiler for compiling the second part, and generating a second executable file, the generating of the second executable file comprising disabling all optimization options of the compiler for compiling the second part and applying at least one optimization option of the compiler for compiling the first part;

wherein the determining of the respective value of the target quantity for each executable file of the at least two different executable files comprise determining a respective value of the target quantity for the first and the second executable file;

wherein the determining of a main performance part comprises comparing the respective value of the target quantity of the first and the second executable file with the value of the target quantity of the reference executable file;

program instructions to determine the main performance part of the source code dependent on the values of the target quantity of the at least two different executable files, wherein the main performance part is the part of the at least first part and the second part that has a greater influence on the target quantity with respect to the different compiler optimization settings; and program instructions to compile the source code to generate the compiled version of the program source code, the compiling of the source code comprising applying a higher optimization level of the compiler for compiling the main performance part than for compiling the remaining part of the source code.

24. The computer system of claim 20, the computer system performing repeated iterations further comprising:

program instructions to split the main performance part of the source code resulting in at least a first part and a second part of the main performance part;

program instructions to generate at least two respective different executable files, the generating of the at least two respective different executable files comprising applying at least one new compiler optimization setting for compiling the first part of the main performance part and applying at least one new compiler optimization setting for compiling the second part of the main performance part;

program instructions to determine a respective value of the target quantity for each executable file of the at least two respective different executable files;

program instructions to determine a respective new main performance part, wherein the respective new main performance part is the part of the at least first part and the second part of the main performance part that has a greater influence on the target quantity with respect to the new compiler optimization settings, wherein the respective new main performance part is the main performance part of a subsequent iteration; and wherein the compiling of the source code for generating the compiled version of the program source code comprises applying a higher optimization level of the compiler for compiling the new main performance part of a last iteration of the iterations than for compiling a remaining rest of the source code.

\* \* \* \* \*